United States Patent
Abu-Omar et al.

(10) Patent No.: US 11,891,473 B2
(45) Date of Patent: Feb. 6, 2024

(54) DECOMPOSABLE AND RECYCLABLE EPOXY THERMOSETTING RESINS

(71) Applicant: The Regents of the University of California, Oakland, CA (US)

(72) Inventors: Mahdi M. Abu-Omar, Goleta, CA (US); Shou Zhao, Goleta, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 154 days.

(21) Appl. No.: 17/294,244

(22) PCT Filed: Nov. 20, 2019

(86) PCT No.: PCT/US2019/062371
§ 371 (c)(1),
(2) Date: May 14, 2021

(87) PCT Pub. No.: WO2020/106815
PCT Pub. Date: May 28, 2020

(65) Prior Publication Data
US 2022/0002472 A1    Jan. 6, 2022

Related U.S. Application Data

(60) Provisional application No. 62/770,545, filed on Nov. 21, 2018.

(51) Int. Cl.
   C08G 59/32    (2006.01)
   C08G 59/28    (2006.01)
   C08J 11/08    (2006.01)

(52) U.S. Cl.
   CPC ......... C08G 59/3227 (2013.01); C08G 59/28 (2013.01); C08J 11/08 (2013.01); *C08J 2363/00* (2013.01)

(58) Field of Classification Search
   None
   See application file for complete search history.

(56) References Cited

U.S. PATENT DOCUMENTS

| | | |
|---|---|---|
| 4,522,962 A | 6/1985 | Abbey et al. |
| 8,785,694 B2 | 7/2014 | Pastine |
| 9,453,099 B2 | 9/2016 | Zhang et al. |
| 9,598,551 B2 | 3/2017 | Liang et al. |
| 9,631,049 B2 | 4/2017 | Pastine et al. |
| 9,862,797 B2 | 1/2018 | Pastine |

(Continued)

FOREIGN PATENT DOCUMENTS

| | | |
|---|---|---|
| CN | 107286324 A | 10/2017 |
| WO | 2011116050 A2 | 9/2011 |

(Continued)

OTHER PUBLICATIONS

Taynton, Philip. Development of polyimine-based dynamic covalent network: From malleable polymers to high-performance composites. Diss. University of Colorado at Boulder, 2015. (Year: 2015).*

(Continued)

*Primary Examiner* — Megan McCulley
(74) *Attorney, Agent, or Firm* — Gates & Cooper LLP

(57) ABSTRACT

A thermoset precursor composition includes a backbone comprising an imine bond bonding at least one of: 1) aromatic compounds together, or 2) bonding an aromatic compound to an aliphatic chain, and at least one of: an epoxy group terminating the backbone or an aldehyde group terminating the backbone. The thermoset precursor can have at least two epoxy groups, one epoxy group and one aldehyde group, or two aldehyde groups.

18 Claims, 22 Drawing Sheets

(56) References Cited

U.S. PATENT DOCUMENTS

| | | | |
|---|---|---|---|
| 2009/0054543 A1 | 2/2009 | Nozawa et al. |
| 2010/0160557 A1 | 6/2010 | Murofushi et al. |
| 2013/0235323 A1 | 9/2013 | Sotzing et al. |
| 2015/0259458 A1 | 9/2015 | Zhang et al. |
| 2017/0051083 A1 | 2/2017 | Eibler et al. |
| 2017/0368535 A1 | 12/2017 | Chopra et al. |
| 2018/0320079 A1 | 11/2018 | Kobilka et al. |
| 2020/0317593 A1 | 10/2020 | Klein et al. |

FOREIGN PATENT DOCUMENTS

| | | |
|---|---|---|
| WO | 2016172353 A1 | 10/2016 |
| WO | 2022212199 A1 | 10/2022 |

OTHER PUBLICATIONS

PCT International Search Report and Written Opinion dated Aug. 2, 2022 for PCT Application No. PCT/US22/21932.

PCT Invitation to Pay Additional Fees and, Where Applicable, Protest Fee dated Jun. 2, 2022 for PCT Application No. PCT/US22/21932.

PCT International Search Report and Written Opinion dated Mar. 18, 2020 for PCT Application No. PCTUS19/62371.

Extended European Search Report dated Jul. 8, 2022 for European Patent Application No. 19887635.1.

Mormann, W., et al., "Liquid crystalline thermosets from triaromatic azomethine group containing diepoxides and 4,4'-methylenedianiline", Macromol. Chem. Phys., 1998, pp. 1935-1938, vol. 199, Issue 9.

Mikroyannidis, J.A., "Epoxides Bearing Azomethine Linkages", Polymer International, 1991, pp. 91-97, vol. 25, No. 2.

\* cited by examiner

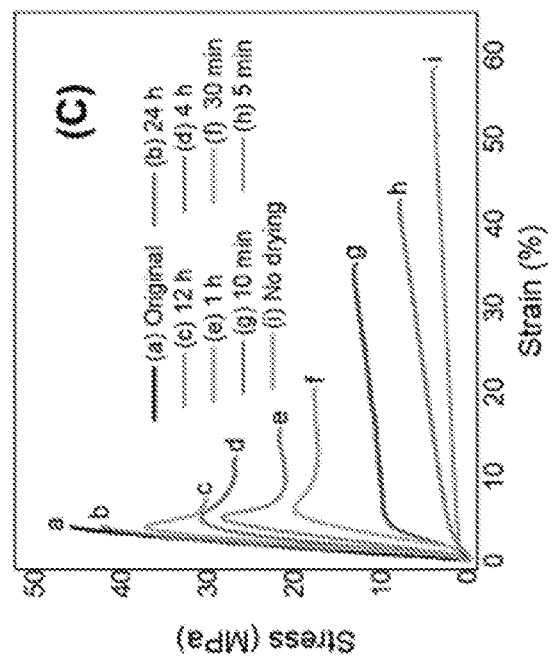
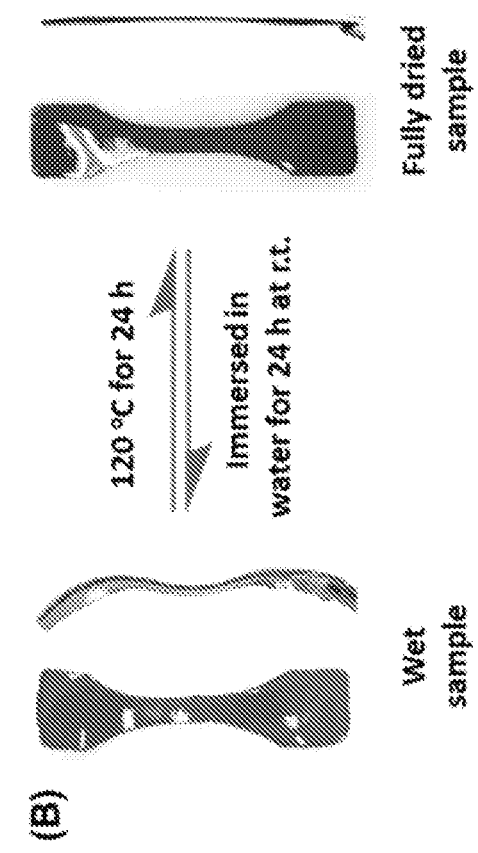
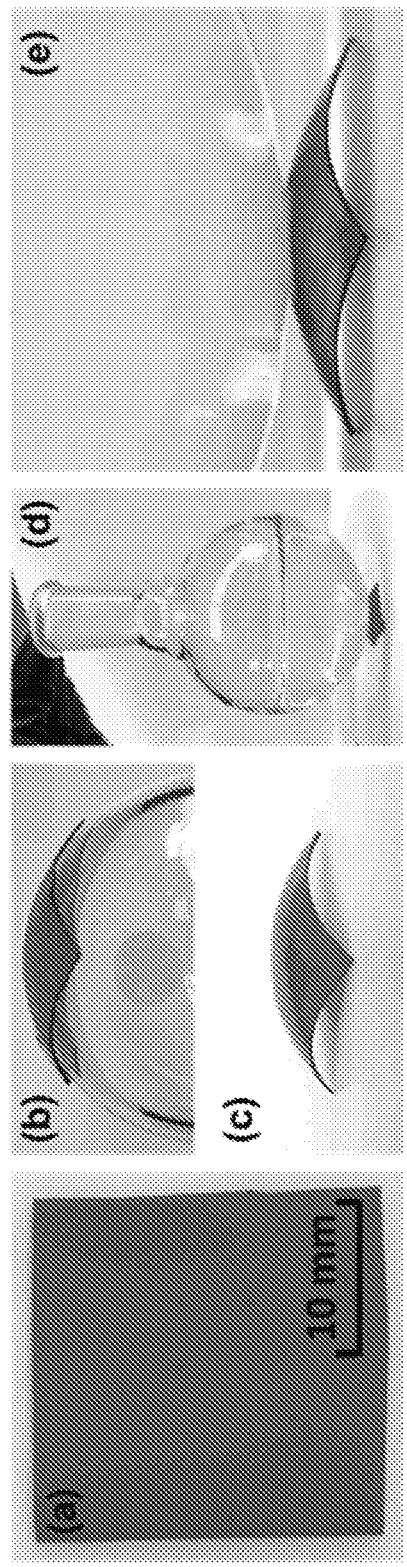
FIG. 22B
FIG. 22C
FIG. 22D

DECOMPOSABLE AND RECYCLABLE EPOXY THERMOSETTING RESINS

CROSS-REFERENCE TO RELATED APPLICATIONS

This application claims the benefit of U.S. Provisional Application No. 62/770,545 filed on Nov. 21, 2019 and entitled "Decomposable and Recyclable Epoxy Thermosetting Resins,", which application is incorporated herein by reference in its entirety for all purposes.

STATEMENT REGARDING FEDERALLY SPONSORED RESEARCH AND DEVELOPMENT

This invention was made with Government support under Grant (or Contract) No. DE-SC0000997 awarded by the Department of Energy. The Government has certain rights in this invention.

FIELD OF THE DISCLOSURE

The present invention relates to decomposable and recyclable epoxy thermosets and their manufacturing and reprocessing methods. The invented thermosets can be used to make carbon fiber reinforced composites (CFRCs), whose carbon fiber can be recycled on demand without damaging its fiber structure and strength.

BACKGROUND

Thermosets are generally referred to polymeric materials that are irreversibly cured from soft solids or liquid prepolymers, with the aid of heat or other action of energy. Epoxy thermosets represent one of the most widely used thermosets. Because of the permanent cross-links, epoxy thermosets generally possess outstanding mechanical properties, chemical and thermal resistance and excellent insulation, which make them intensively used as matrices in composite materials, adhesives, coatings and encapsulating materials. However, epoxy thermosets are infusible and insoluble after curing, which make them difficult to be reshaped, reprocessed, or recycled.

To combine the desirable attributes of conventional thermosets with the dynamics of controllably reversible bonds, covalently adaptable networks (CANs) have been recently developed. While still covalently cross-linked within the network, CANs can achieve stress relaxation and reversible depolymerization through bond exchange or bond breaking and reformation, which confer re-processiblity to conventional thermosets that are otherwise intractable.

Limited studies on epoxy cross-linked CANs have been reported in academic literature. For example, Leibler, et al. developed a malleable thermoset by epoxy-carboxylic acid reaction, while the malleability was realized through metal-catalyzed reversible transesterification at elevated temperature (*Science*, 2011, 334, 965-968; U.S. Pat. No. 9,562,132 B2). Zhang, et al. synthesized an epoxy amine cross-linked thermoset embedded with Diels-alder (DA) bonds (*Macromolecules*, 2015, 48, 316-322). The thermoset could be converted to soluble polymers with the aid of sonication and recurred to thermoset via DA reaction. Odriozola, et al. used diglycidyl ether of bisphenol A (DGEBA) to react with a disulfide-containing amine hardener for making fiber-reinforced polymer composites, and the recyclability of composites was derived from the exchangeable disulfide bonds (*Mater. Horiz.*, 2016, 3, 241-247).

However, these studies suffer negative issues including: need for hot press molding when recycling, need for expensive metal catalysts, need for additional monomers or special treatments (e.g., sonication) when reprocessing, synthetic difficulty and use of non-renewable building blocks.

In patent literature several examples of covalently adaptable networks (CANs) incorporated in recyclable thermoset have been disclosed. For example, W. Zhang, et al, (University of Colorado) U.S. Pat. No. 9,453,099 (2016) developed a malleable and recyclable thermoset system. Disadvantageously, the system developed by Zhang, et al. requires addition of additional monomer for thermoset recycling. Additionally, the thermoset was shown to have significant loss of strength when exposed to water.

CANs have also been incorporated in recyclable thermosets as disclosed in S. Pastine (Connora Technologies, Inc.) U.S. Pat. No. 8,785,694 (2014), S. Pasine, et al. (Connora Technologies, Inc.) U.S. Pat. No. 9,631,049 (2017), B. Liang, et al. (Adesso Advanced Materials Wuhu Co., Ltd.) U.S. Pat. No. 9,598,551 (2017), and S. Pastine (Connora Technologies, Inc.) U.S. Pat. No. 9,862,797 (2018). Disadvantageously, these systems require incorporation of acetal functionality in the amine hardeners used. Amine hardeners containing acetal functionality are not typically commercially available and are synthesized with low conversion and low yield, and require use of hazardous chemicals.

SUMMARY

In some embodiments, a thermoset precursor composition includes a backbone comprising an imine bond bonding at least one of 1) aromatic compounds together, or 2) bonding an aromatic compound to an aliphatic chain, and at least one of: an epoxy group terminating the backbone or an aldehyde group terminating the backbone. The thermoset precursor can have at least two epoxy groups, one epoxy group and one aldehyde group, or two aldehyde groups.

In some embodiments, a method of making a thermoset composition can include combining an aldehyde and an amine so as to form a backbone comprising an imine bond bonding at least one of: 1) a plurality of aromatic compounds, or 2) an aromatic compound and an aliphatic chain, and bonding an epoxy group or an aldehyde group to at least one end of the backbone.

In some embodiments, a thermoset composition can include a first backbone, a second backbone, and one or more cross-link bonds between the first backbone and the second backbone. The first backbone can include an imine bond bonding at least one of 1) aromatic compounds together, or 2) bonding an aromatic compound to an aliphatic chain, and the second backbone can include an imine bond bonding at least one of 1) aromatic compounds together, or 2) bonding an aromatic compound to an aliphatic chain.

In some embodiments, a method of making a thermoset can include providing a plurality of thermoset precursors, contacting the plurality of thermoset precursors with a hardener, and forming a plurality of cross-links between the plurality of thermoset precursors in response to contacting the plurality of thermoset precursors with the hardener. Each thermoset precursor of the plurality of thermoset precursors comprises a backbone comprising an imine bond bonding at least one of: 1) aromatic compounds together, or 2) bonding an aromatic compound to an aliphatic chain, and at least one of an epoxy group terminating the backbone or an aldehyde group terminating the backbone.

In some embodiments, a method of recycling a thermoset composition comprises dissolving a first component formed from a thermoset composition in a solvent to form a mixture, removing at least a portion of the solvent from the mixture, reforming the thermoset composition into a second component, and removing any remaining solvent from the second component to reform the thermoset composition as the second component.

In some embodiments, a method of combining components made from a thermoset composition comprises contacting a plurality of pieces formed from a thermoset composition, applying at least one of heat or a promoter to the plurality of pieces during the contacting, forming a plurality of cross-links between the plurality of pieces in response to applying at least one of the heat or the promoter, and combining the plurality of pieces based on the formation of the plurality of cross-links.

In some embodiments, a method of recycling a filler in a thermoset composition comprises dissolving a first component formed from a first thermoset composition in a solvent to form a mixture, filtering a filler material from the mixture, combining the filler material with a second thermoset composition, and forming a second component formed from the second thermoset composition and the filler material. The first component is a composite material comprising the first thermoset composition and the filler.

These and other features will be more clearly understood from the following detailed description taken in conjunction with the accompanying drawings and claims.

BRIEF DESCRIPTION OF THE DRAWINGS

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention. Referring now to the drawings in which like reference numbers represent corresponding parts throughout:

FIG. 22B illustrates the wet and soft EN-VAN-AP sample that has been submersed in water for 24 h at room temperature could be restored to rigid dry sample by heating at 120° C. for 1 day according to Example 15.

FIG. 22C illustrates the tensile properties of a wet sample after different periods of heating at 120° C. The sample without drying (i) was tested immediately after collecting from water.

FIG. 22D illustrates the water-driven malleability of EN-VAN-AP. In inset (a), the thermoset film with the thickness of 0.4 mm was immersed in water for 4 h at room temperature. In inset (b), the soft film was stretched on a round glass mold and dried in a desiccator wider reduced pressure. In inset (c), the shape of dried sample was retained. In inset (d), the reshaped sample could support at least 240 g of load without significant deformation. In set (e) illustrates an enlarged picture of the thermoset that was supporting 240 g of load.

DETAILED DESCRIPTION

Figure 1:
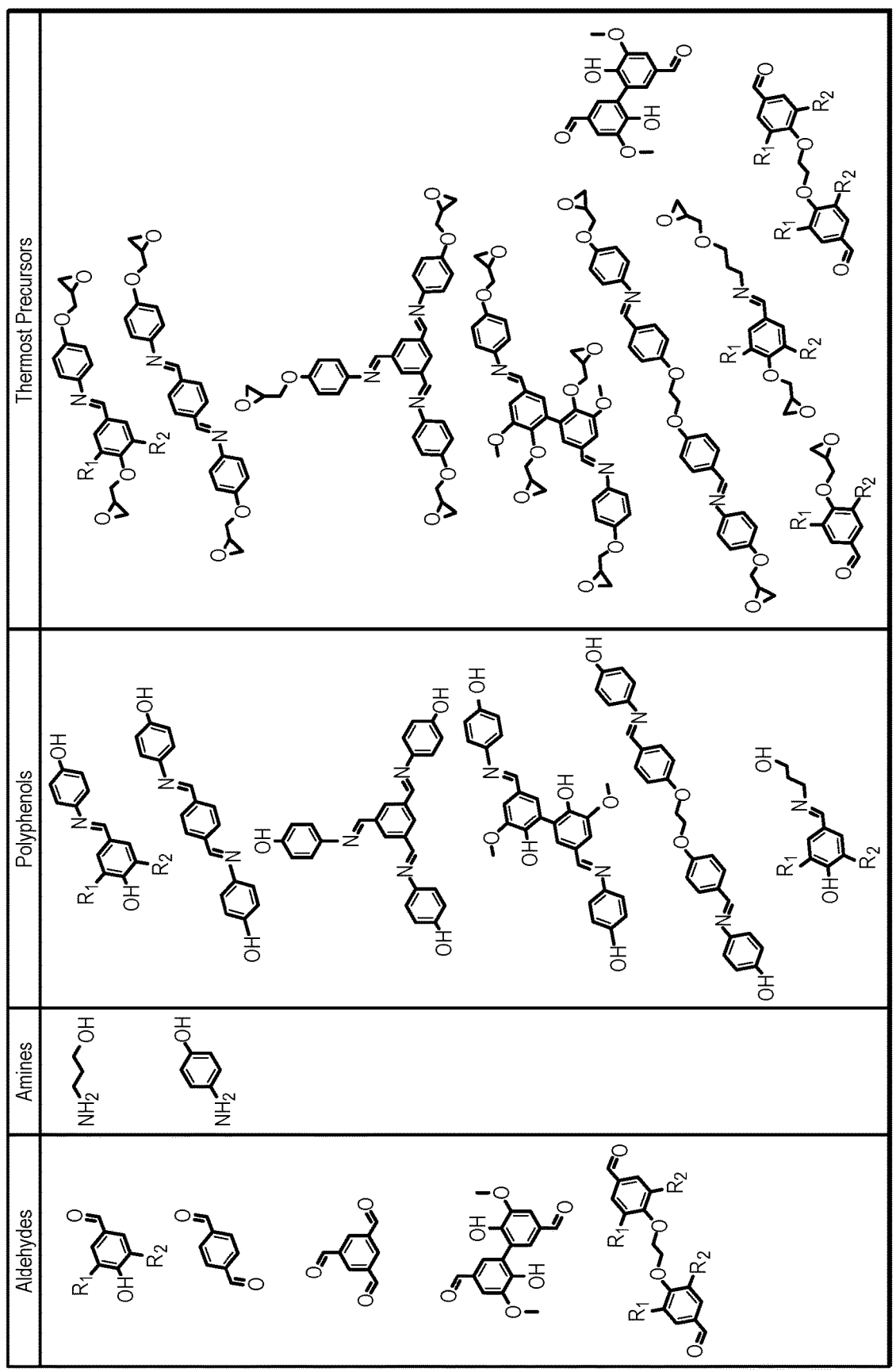
FIG. 1 shows structures of thermoset precursors prepared from different aldehydes and amines according to some embodiments.

To combine the desirable attributes of conventional thermosets with the dynamics of controllably reversible bonds, covalently adaptable networks (CANs) have been developed. While still covalently cross-linked within the network, CANs can achieve stress relaxation and reversible depolymerization through bond exchange or bond breaking and reformation, which confer re-processiblity to conventional thermosets that are otherwise intractable.

In patent literature several examples of covalently adaptable networks (CANs) incorporated in recyclable thermoset have been disclosed. For example, W. Zhang, et al. (University of Colorado) U.S. Pat. No. 9,453,099 (2016) (hereinafter Zhang, et. al) developed a malleable and recyclable thermoset system. There are several noteworthy, deficiencies with the technology reported by W. Zhang, et al., which are addressed in the materials and processes disclosed herein including:

1) Depolymerization of CANs in recyclable thermoset as reported by W. Zhang, et al. requires addition of excess amine monomer. Depolymerization of recyclable thermoset disclosed herein does not require addition of excess amine monomer.

2) Materials for synthesis of recyclable thermosets by W. Zhang, et al. are not sourced from biomass of renewable sources. The recyclable thermoset synthesis disclosed herein can incorporate chemicals sourced from biomass or renewable sources.

3) The aromatic aldehydes W. Zhang, et al. used often have high melting points (e.g., terephthalaldehyde m.p.=115° C.). Thus, it requires the use of carrier solvents to dissolve all monomers prior to the evaporation of solvents for up to 24 h and cross-linking. The total preparation time, including solvent evaporation and cross-takes more than 1 day and the whole process requires excessive use of organic solvents. In one or more embodiments of the technology disclosed herein the example monomers used are similar to existing epoxy resins and can use solvent-free resin casting methods to prepare thermosets with select lower m.p. (80-100° C.) monomers, requiring much less thermoset preparation time. The thermoset disclosed herein can be fully cross-linked within 6 h if cured at temperature above 120° C.

4) The polyimine thermosets reported by W. Zhang, et al. contain excessive amounts of water-sensitive imine bonds that could make the thermosets more sensitive to water. In one or more embodiments, the thermosets disclosed herein contain less imine cross-links and thus have improved water-resistance.

Decomposable thermosets have also been disclosed in S. Pastine (Connora Technologies, Inc.) U.S. Pat. No. 8,785,694 (2014), S. Pastine, et al. (Connora Technologies, Inc.) U.S. Pat. No. 9,631,049 (2017), B. Liang, et al. (Adesso Advanced Materials Wuhu Co., Ltd.) U.S. Pat. No. 9,598,551 (2017), and S. Pastine (Connora Technologies, Inc.) U.S. Pat. No. 9,862,797 (2018). There are several noteworthy deficiencies with the technology reported in previous work which are addressed in the one or more embodiments of invention disclosed herein including:

1) Work by S. Pastine and B. Liang utilized acetal-incorporated amine hardeners which require high inputs of organic solvents and hazardous reagents, while the yield is relatively low (42-72%). Advantageously, embodiments of the recyclable thermoset described herein does not require acetal-incorporated amine hardeners.

2) Formation of acetal bonds is irreversible. Therefore, recyclable thermoset reported by S. Pastine and B. Liang which incorporate acetal bonds may be depolymerized through the cleavage of acetal bonds, but cannot be regenerated to obtain their original properties. The depolymerized polymers could still be used to make other types of polymers like thermoplastics, however, additional reagents and solvents are needed. Advantageously, embodiments of the recyclable thermoset described herein can be fully recycled to make new thermoset with the same physical properties.

3) Work by S. Pastine and B. Liang did not synthesize recyclable thermoset using reagents sourced from biomass of renewable sources. Embodiments of the recyclable thermoset synthesis disclosed herein can incorporate chemicals sourced from biomass or renewable sources.

4) Work by S. Pastille and B. Liang developed thermosets which cannot be self-healed, re-shaped or welded. Advantageously, embodiments of the recyclable thermoset described herein can be self-healed, re-shaped, and welded.

CANs are broadly classified into two groups, the dynamic structure of which is obtained either kinetically by bond exchange (associative) or through equilibrium shifts leading to reversible depolymerization (dissociative). Among recognized dynamic bonds, the imine bond is unique because it can undergo both associative (imine-amine exchange) and dissociative (imine hydrolysis and reformation) reactions. By embedding inline bonds into epoxy cross-linked networks as intermolecular linkages, an epoxy thermoset that possesses high thermomechanical properties, but can still be easily reprocessed is provided. It can be degraded, recycled, and repaired/healed on-demand without requiring complicated processing or additional ingredients such as a metal catalyst or additional monomer. The described recyclable thermoset can also use a bisphenol that employs vanillin, VAN, a renewable and lignin-derived molecule.

This disclosure describes methods for the preparation of recyclable thermoset polymers. The process can be composed of synthesis of epoxy-terminated compounds with embedded imine bonds and then cross-linking with a hardener to form a thermoset. Alternatively, the process can be composed of synthesis of compounds with both aldehyde and epoxy groups at the end followed by cross-linking with an amine hardener to form a thermoset. Moreover, the process can be composed of synthesis of compounds with at least two aldehyde groups followed by cross-linking with amine hardeners to make a thermoset.

A process for synthesizing decomposable and recyclable epoxy thermosets is also disclosed herein. The resulting epoxy thermoset possesses comparable properties to conventional thermosets made from bisphenol A. However, when treated by a stimulus such as acid, elevated temperature and/or water, embodiments of the described thermoset exhibits re-processiblity.

Also disclosed herein is a catalyst-free and press molding free process for recycling the epoxy thermosets. Through breaking and reforming the imine bonds, the epoxy thermosets can be: 1) decomposed and solubilized in organic or aqueous solutions under mild conditions, and 2) reformed from the solutions while original thermal and mechanical properties are retained.

Also disclosed herein is a catalyst-free process for reshaping and repairing the epoxy thermosets. Through imine exchange reaction, the epoxy thermosets at sufficient temperature can be: 1) reshaped through bond exchange within polymer networks, and 2) welded through bond exchange at the interface of overlapping thermoset pieces.

Additionally disclosed herein is a process to recycle the carbon fiber from carbon fiber reinforced composite (CFRC), without damaging the structure and strength of the carbon fiber.

As disclosed herein, the following naming conventions are used to described various compounds including: Vanillin (VAN), 4-aminophenol (AP), epichlorohydrin, tetrabutylammonium bromide (TBAB), diglycidyl ether of bisphenol A (DGEBA), terephthalaldehyde (TPA), Jeffamine (poly (propylene glycol) bis(2-aminopropyl ether)) (average molecular weight of 230 or 400) (all available from Aldrich Chemical Co.). Concentrated hydrochloric acid (e.g., ~37%) as used herein is available from Fisher Scientific.

In some embodiments, synthesis of thermoset precursors is described. Thermoset precursors contain but are not limited to molecules containing at least two epoxy groups, one epoxy group and one aldehyde group, or two aldehyde groups. As used herein, epoxy groups can refer to glycidyl type and cycloaliphatic type. Thermoset precursors can contain, but are not limited to, bisphenolic compounds, compounds containing aromatic rings and optional aliphatic chains, compounds containing imine bonds, or any combination thereof. Advantageously, thermoset precursors can include, but are not limited to, use of aromatic aldehydes, including, for example, 4-hydroxylbenzylaidehyde, vanillin, and syringaldehyde, which can be derived from renewable sources (e.g., wood biomass). A non-limiting representation of suitable aldehydes, ketones, and amines that can be combined to synthesize the thermoset precursors is demonstrated in FIG. 1.

In one or more examples, synthesis of thermoset precursors is carried out by reaction of an aromatic or aliphatic aldehyde-containing compound, with an amine containing molecule. Any suitable synthesis route can be used. For example, the thermoset precursors can be prepared by dissolving the reagents in a solvent. Suitable solvents can include, but are not limited to, water, N, N-dimethylformamide, ethanol, methanol, toluene, benzene, THF, DMSO, ethyl acetate, isopropyl alcohol, or any combination thereof. The molar concentration of each reagent can be between about 0.01-5 M. The reaction mixture is stirred at 0-100° C. for 0-24 hours before cooling. The resulting product can be isolated by precipitation from the reaction solution or by removal of the solvent. The resulting product can then be reacted with a glycidylation agent. Suitable glycidylation agents can include, but are not limited to, epichlorohydrin. The resulting mixture can be heating at about 0-120° C. for between 0.01-24 hours in the presence of an optional phase transfer catalyst and/or a base including, but not limited to, sodium hydroxide, magnesium hydroxide, calcium hydroxide, or potassium hydroxide. The reaction mixture can then be cooled to yield a thermoset precursor. The salt byproducts can optionally be removed by filtration.

Alternatively, synthesis of thermoset precursors can be carried out by reaction of an aromatic or aliphatic aldehyde-containing compound directly with a glycidylation agent including but not limited to epichlorohydrin. The reaction mixture can be heated to between 0-120° C. for 0-24 hours in the presence of the optional phase transfer catalyst and a base including any of those described herein. The reaction mixture can be cooled to yield a thermoset precursor, which can optionally be precipitated from the resulting solution to yield a thermoset precursor.

The thermoset precursors described herein can be reacted with cross-linking hardeners to form thermoset polymers. Suitable cross-linking hardeners can include, but are not limited to, amines, carboxylic acids, anhydrides, amides, isocyanates, and phenolic resins.

In the invention described herein synthesis of thermoset polymer(s) is described, and in some embodiments, the thermoset polymer(s) as described herein can simply be referred to as a thermoset or thermosets. The thermoset can be made using a number of processes. For example, the thermoset can be made via a reaction of at least one thermoset precursor with at least one cross-linking hardener. Synthesis of a thermoset can comprise mixing one or more thermoset precursors with one or more cross-linking hardeners at a temperature of between about 0-200° C., or between 0-40° C. for 0.01-48 hours. For precursors with only epoxy groups, the epoxy:NH— molar ratio is between 1:5 to 5:1. For precursors with only aldehyde groups, the aldehyde:NH— molar ratio is between 1:8 to 4:1. For precursors with both epoxy and aldehyde groups, the epoxy: aldehyde:NH— molar ratio follows the above epoxy:NH— and aldehyde:NH— ranges.

The thermoset(s) can optionally be combined with other materials to form composite materials. Additional components can include, but are not limited to, monomers, polymers, fillers, plasticizers, fibers (e.g., carbon fibers, glass fibers, etc.), metals, glass, wood, flame retardants, pigments, dyes, antioxidants, lubricants, and combinations thereof can optionally be mixed with the thermoset precursor and cross-linking hardener to form a composite material. Mixing of the thermoset precursor and cross-linking hardener can be performed by dissolving the materials in a solvent or as a neat reaction where no solvent is used. Solvents in which the thermoset precursor and cross-linking hardener can be dissolved include, but are not limited to, N, N-dimethylformamide, ethanol, methanol, toluene, benzene, THF, DMSO, ethyl acetate, and isopropyl alcohol. After mixing the thermoset precursor and cross-linking hardener, the mixture can optionally be poured into a mold and heated at between 60-200° C. for between 0.01-48 hours to yield a thermoset. If solvent was used in previous steps, the solvent can be removed by evaporation by applying a vacuum and/or heat to the system.

The resulting thermoset can generally be considered a solid material. When additional components are present, the material can be a composite material that can be used in a variety of industries.

In some embodiments, an epoxy thermoset composition can result from contacting at least one thermoset precursor with at least one hardener. In some embodiments, a thermoset precursor refers to a compound that has at least two epoxy groups, at least one epoxy group and at least one aldehyde group; or at least two aldehyde group.

In some embodiments, a thermoset precursor is a bisphenolic compound that is connected by imine bond, while at least one epoxy group is attached to each aromatic ring.

In some embodiments, a thermoset precursor contains an aromatic ring and an aliphatic chain that are connected by imine bond, while at least one epoxy group is attached to each of the aromatic ring and aliphatic chain.

In some embodiments, a thermoset precursor contains at least three aromatic rings that are connected by imine bonds, while at least one epoxy group is attached to each terminal aromatic ring.

In some embodiments, a thermoset precursor has at least two aromatic rings that are connected to a dialdehyde or a diamine linker through imine bonds, while at least one epoxy group is attached to each terminal aromatic ring.

In some embodiments, a precursor contains at least one epoxy group and at least one aldehyde group. In some embodiments, a thermoset precursor contains at least two aldehyde group. The epoxy group can refer to a glycidyl type and/or cycloaliphatic type epoxy.

In some embodiments, thermoset hardeners for cross-linking epoxides can include amines, carboxylic acids, anhydrides, amides, isocyanates, phenolic resins, and combinations thereof. In some embodiments, the thermoset hardener comprises an amine hardener, which can be selected due to their high reactivity to epoxy group. The addition of amine hardener can also help tune the rate of imine exchange reaction, which can help to control the hardening times. Depending on the thermoset precursor(s) used, proper hardeners and cross-linking conditions should be employed to keep the imine bonds of the thermoset precursor(s) intact during the cross-linking process. A non-limiting representation of aldehydes, ketones and amines that can be combined to synthesize the thermoset precursors is demonstrated in FIG. 1. Alternative aldehydes, ketones and amines, and/or the resulting thermoset precursor can be used in addition to those illustrated in FIG. 1.

The thermoset can be made by reacting at least one thermoset precursor with at least one thermoset hardener. Because the aromatic aldehydes, including 4-hydroxybenzylaldehyde, vanillin and syringaldehyde, can be derived from renewable sources (e.g., wood biomass), the use of these aldehydes as building blocks increases the sustainability of obtained thermosets.

Once formed, the thermosets can be coated with a composition to improve the resistance to various chemicals including water and/or solvents. In addition to or in place of a coating, one or more additives can be added into the thermoset composition during formation to improve the water and/or solvent resistance of the resulting thermoset composition.

In some embodiments, a method of making a thermoset can comprise mixing at least one thermoset precursor with at least one hardener at a starting temperature, heating the mixture at elevated temperature and cooling the resulting thermoset to at or near the starting temperature. For example, the at least one thermoset precursor can be mixed with the at least one hardener at or near room temperature, heated to initiate the reaction, and cooled back to at or near room temperature.

In some embodiments, the method comprises mixing at least one thermoset precursor with at least one hardener at elevated temperature, heating the mixture at elevated temperature and cooling the resulting thermoset to room temperature.

In some embodiments, the method comprises dissolving at least one thermoset precursor with at least one hardener in aqueous or organic liquid; and transferring or converting the resulting mixture into dry form.

In some embodiments, the method comprises the reprocessing of an already prepared thermoset. This can allow different structures to be prepared from an existing thermoset composition.

In some embodiments, additional components can be introduced during the thermoset making process, including during the initial formation process and/or during a reprocessing step. In some embodiments, the additional components can include, but are not limited to, monomers, polymers, fillers, plasticizers, fibers (e.g., carbon fibers, glass fibers, etc.), metals, glass, wood, flame retardants, pigments, dyes, antioxidants, lubricants, or any combination thereof.

The resulting mechanical properties of the recyclable thermosets according to one or more embodiments disclosed herein are comparable to conventional bisphenol A (BPA) based thermosets. For example, the recyclable thermosets described herein can exhibit tensile strength of between 5-100 MPa and an elongation of between 0-500%, a glassy storage modulus at 30 ($E_{30}'$) of between 500-20,000 MPa and a glass transition temperature ($T_g$) of between 25-250° C. These values were obtained using the procedures as described herein. Additionally, recyclable thermosets described herein can be tuned to exhibit onset degradation temperature (temperature at 5 wt. % loss) of between 270-450 based on the composition of the thermoset precursors, the selection of the thermoset hardener, and/or the reaction conditions. Additionally, the recyclable thermosets described herein are resistant to various solvents including benzene, toluene, tetrahydrofuran (THF), ethanol, N,N-dimethylformamide (DMF), dimethyl sulfoxide (DMSO) and water at elevated temperature, with less than 50% mass loss when immersed in the respective solvents at 65° C. for 24-72 hours.

Figure 2A:
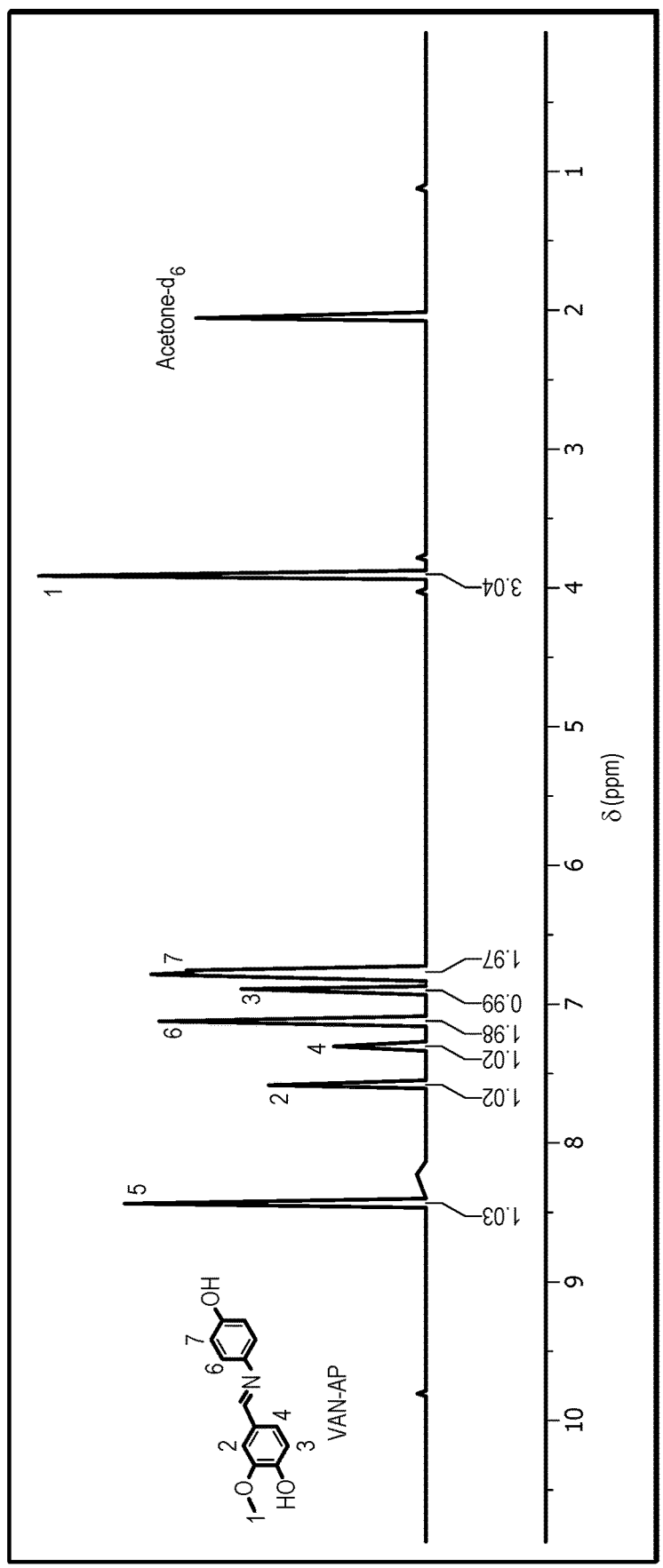
FIG. 2A shows proton spectra of VAN-AP.
Figure 2B:
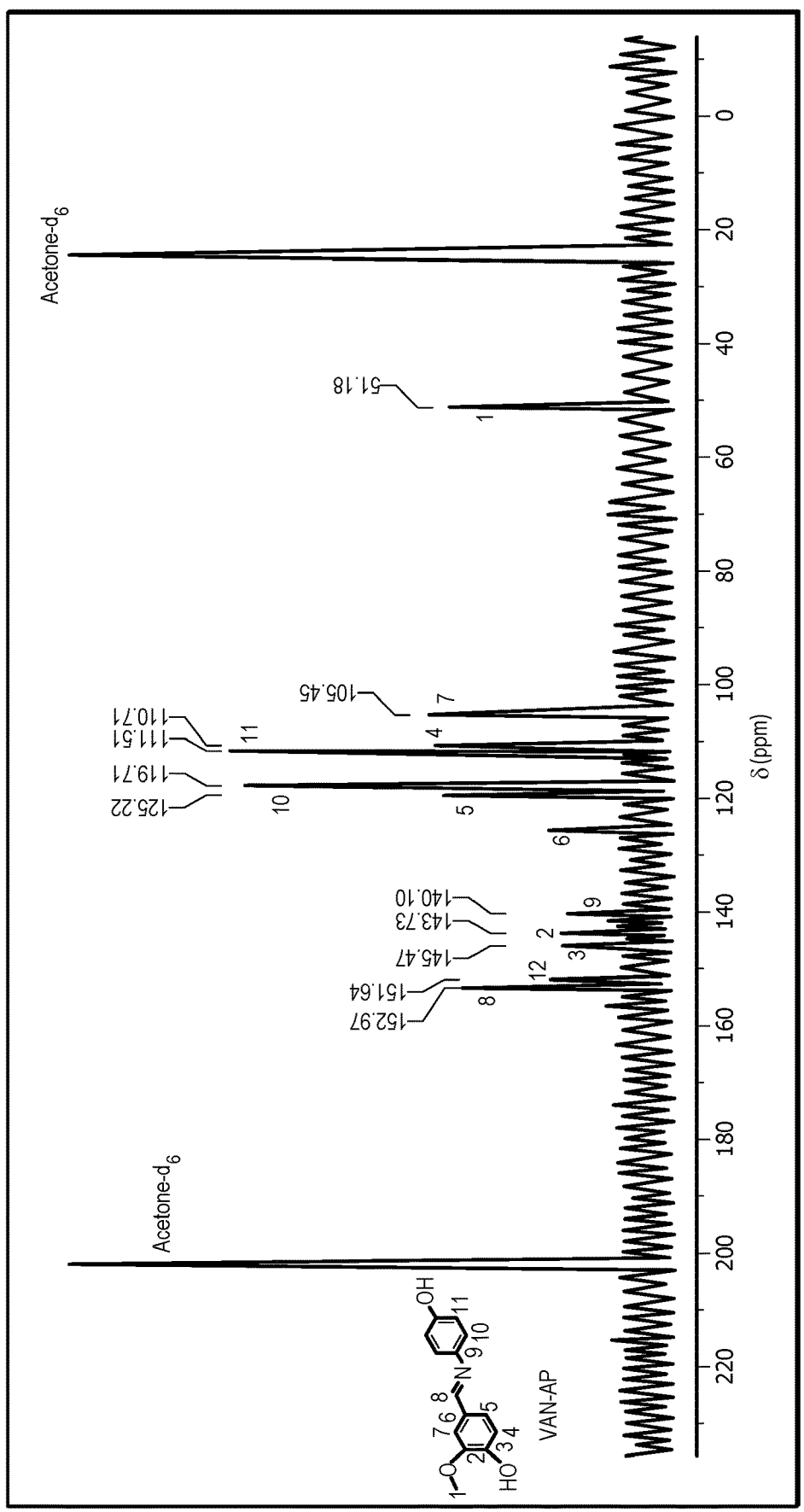
FIG. 2B shows carbon NMR spectra of VAN-AP.
Figure 3A:
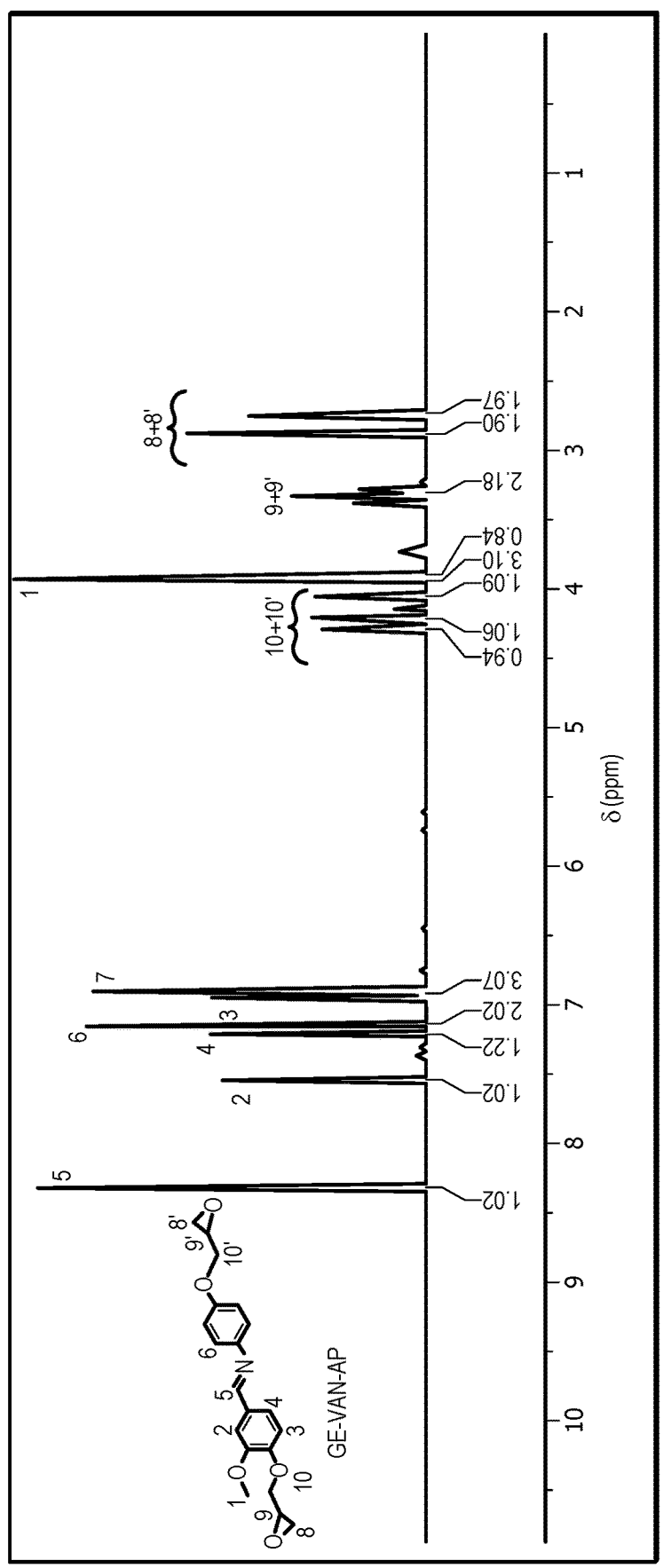
FIG. 3A shows proton spectra of GE-VAN-AP.
Figure 3B:
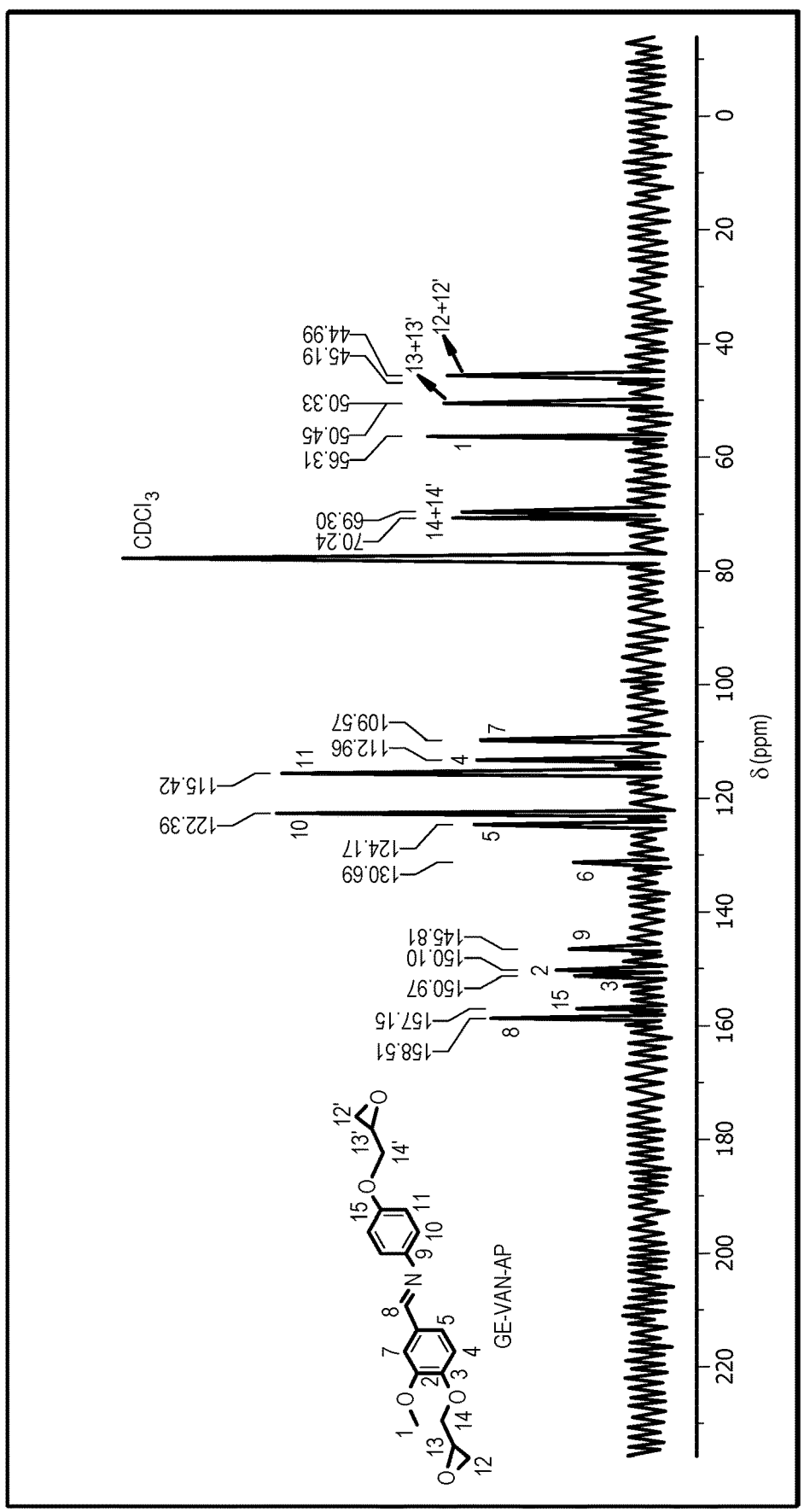
FIG. 3B shows carbon NMR spectra of GE-VAN-AP.
Figure 4:
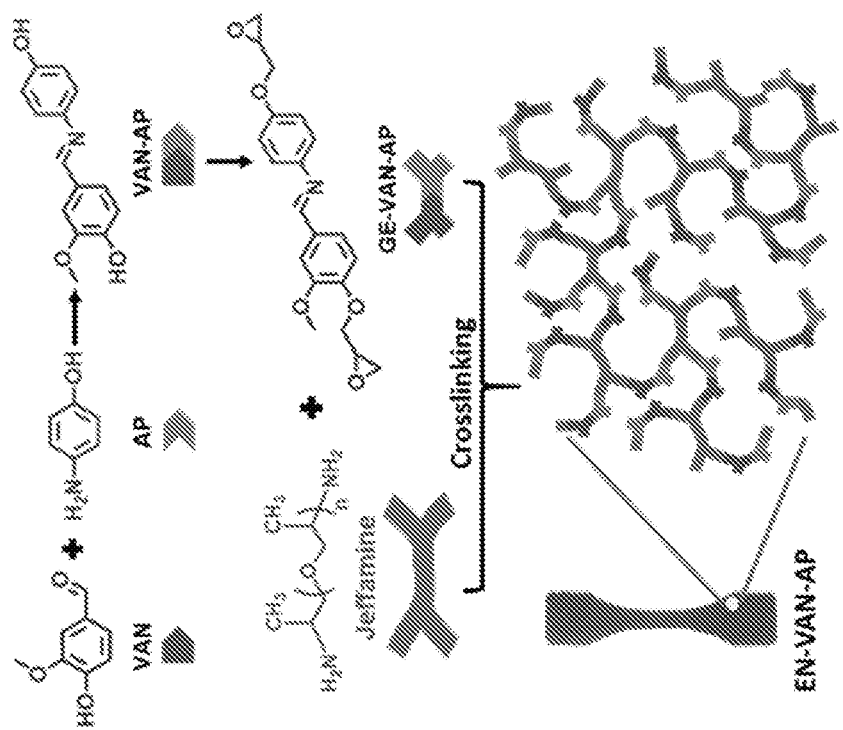
FIG. 4 shows synthetic scheme of EN-VAN-AP.
Figure 5:
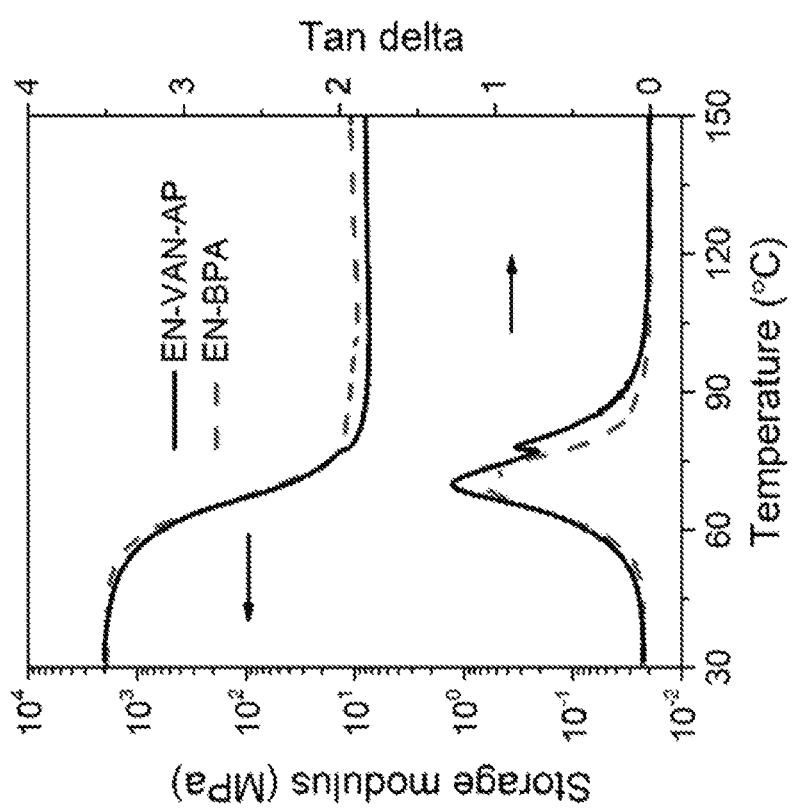
FIG. 5 shows dynamic mechanical analysis of EN-VAN-AP and EN-BPA.
Figure 6:
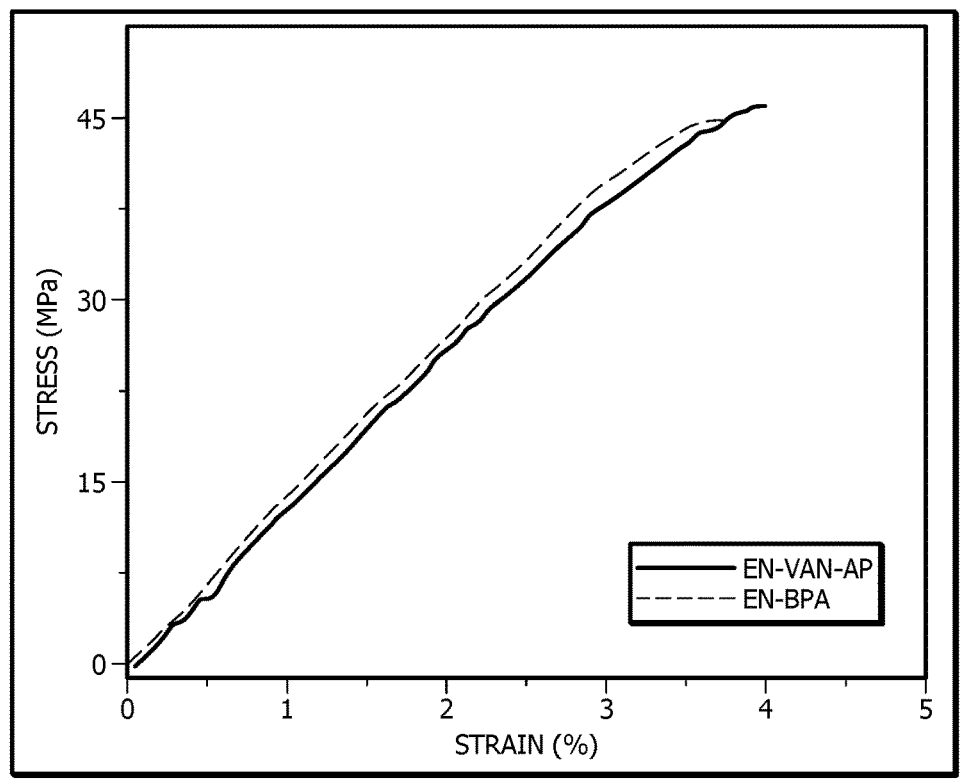
FIG. 6 demonstrates tensile properties of EN-VAN-AP and EN-BPA.

As an example, an epoxy thermoset was prepared to compare to the conventional BPA-based epoxy thermoset. The starting phenolic compound was prepared by reacting vanillin with 4-aminophenol to achieve a bisphenol (VAN-AP) bridged by an imine bond (FIG. 2A-2B). While VAN-AP possesses structure like the conventional BPA, the attachment of aryl groups to both nitrogen and carbon atoms of imine bonds is an important structural characteristic that leads to the complete reaction of aromatic aldehyde and amine, which improves the efficiency at the stage of monomer synthesis and polymer recycling. After converting the bisphenol to epoxy precursor (FIG. 3A-3B) and cross-linking with an amine hardener (e.g., Jeffamine D-400, CAS 9046-10-0. Mn=400 g/mol), the resulting thermoset (FIG. 4) exhibited tensile strength and elongation of 46 MPa and 4%, glassy storage modulus at 30° C. ($E_{30}'$) of 2075 MPa and glass transition temperature ($T_g$) of 70° C. These properties are comparable to BPA-based thermoset (EN-BPA), which was prepared using the same cross-linking condition as VAN-AP based thermoset (FIG. 5 and FIG. 6). The comparable properties were attributed to the structural similarity between VAN-AP and BPA. Meanwhile, the measured properties suggested the incorporation of dynamic imine bonds did not impair the mechanical properties of epoxy-cross-linked resin.

Figure 7:
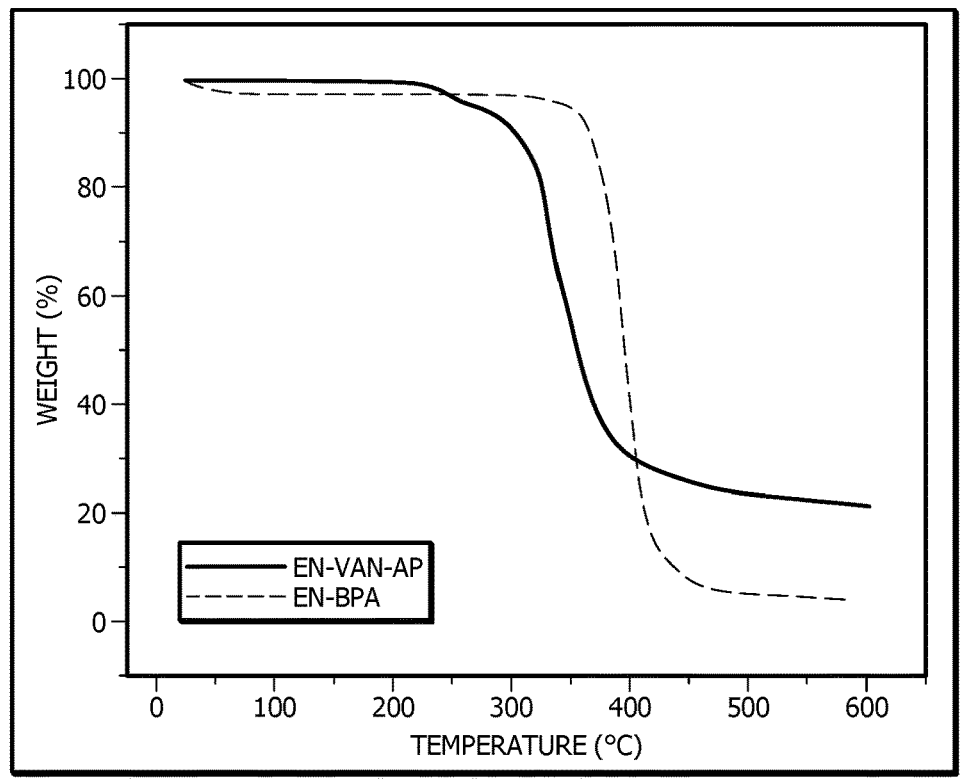
FIG. 7 demonstrates thermogravimetric analysis of EN-VAN-AP and EN-BPA.
Figure 8B:
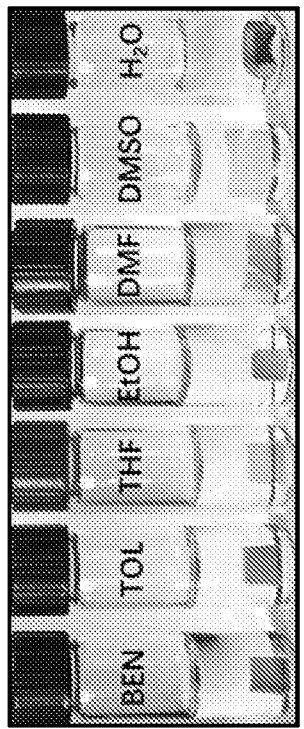
FIGS. 8A-8D illustrate images of EN-VAN-AP dissolved in various organic or aqueous solvents and under various temperatures
Figure 8D:
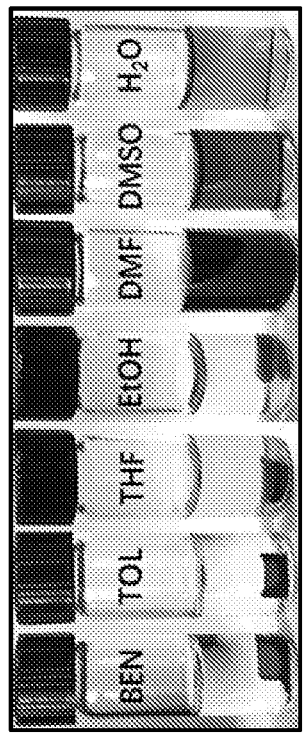
Figure 8A:
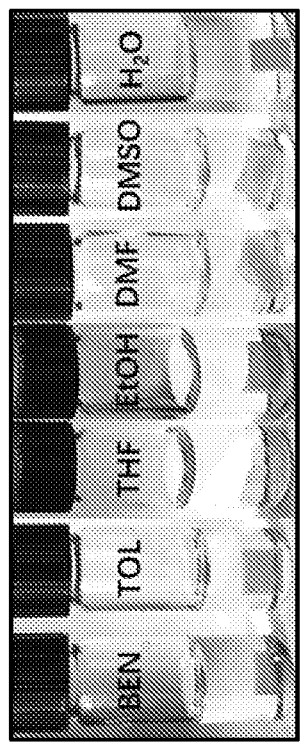
Figure 8C:
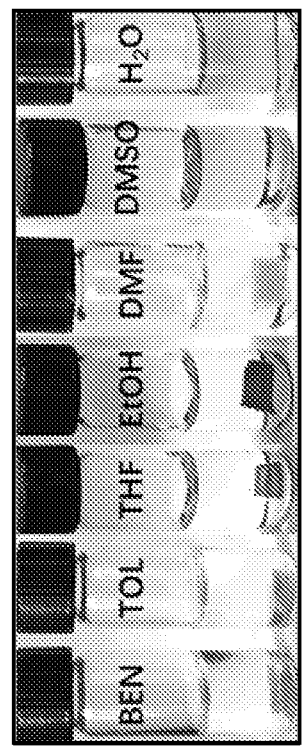
Figure 8E:
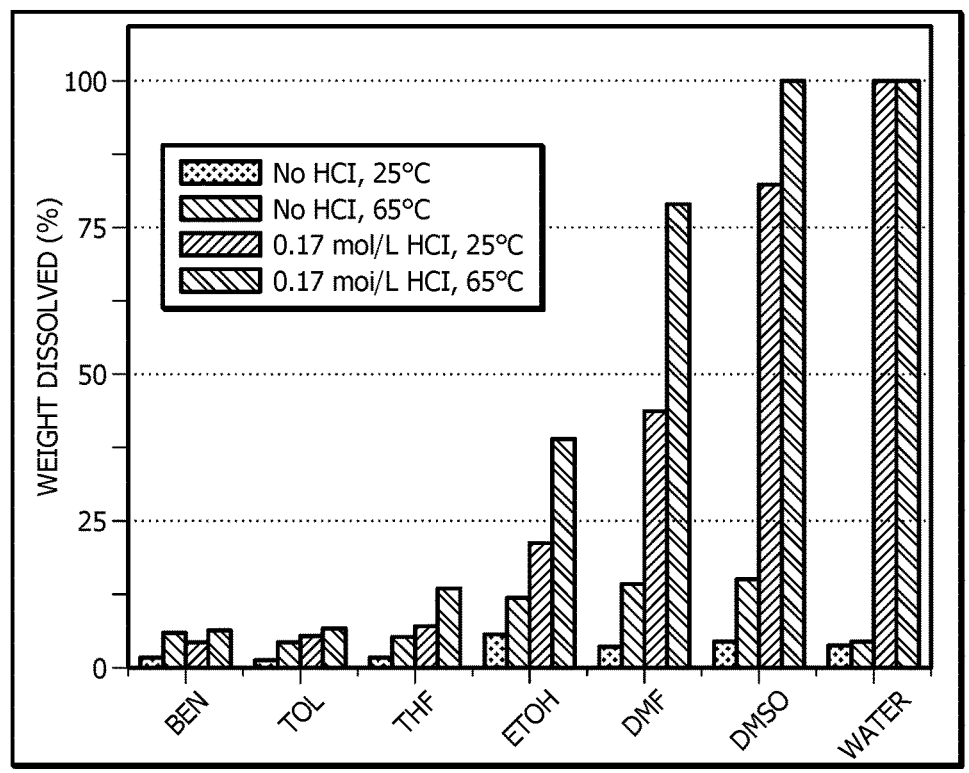
FIG. 8E illustrates a chart of the weight percentages of EN-VAN-AP dissolved in various solvents under various conditions.

In some embodiments, by using precursors and hardeners with different rigidity and number of epoxy group, thermosets with various mechanical properties can be obtained. Onset degradation temperature (temperature at 5 wt. % loss) of EN-VAN-AP was lower than EN-BPA (271° C. vs 350° C.), which was attributed to the increased dissociating tendency of imine bonds at elevated temperature (FIG. 7). EN-VAN-AP showed good resistance to various solvents including benzene, toluene, tetrahydrofuran (THF), ethanol, N,N-dimethylformamide (DMF), dimethyl sulfoxide (DMSO) and water at elevated temperature. EN-VAN-AP exhibited mainly swelling behavior, with limited portion dissolved (<15 wt. %, FIGS. 8B and 8E) after being immersed in the solvents at 65° C. for 2 days. Overall, VAN-AP derived epoxy thermoset exhibits properties in line with the conventional BPA-based counterpart when the same hardener and curing conditions are employed, which suggests VAN-AP could be a suitable thermoset precursor for a range of applications.

Figure 9:
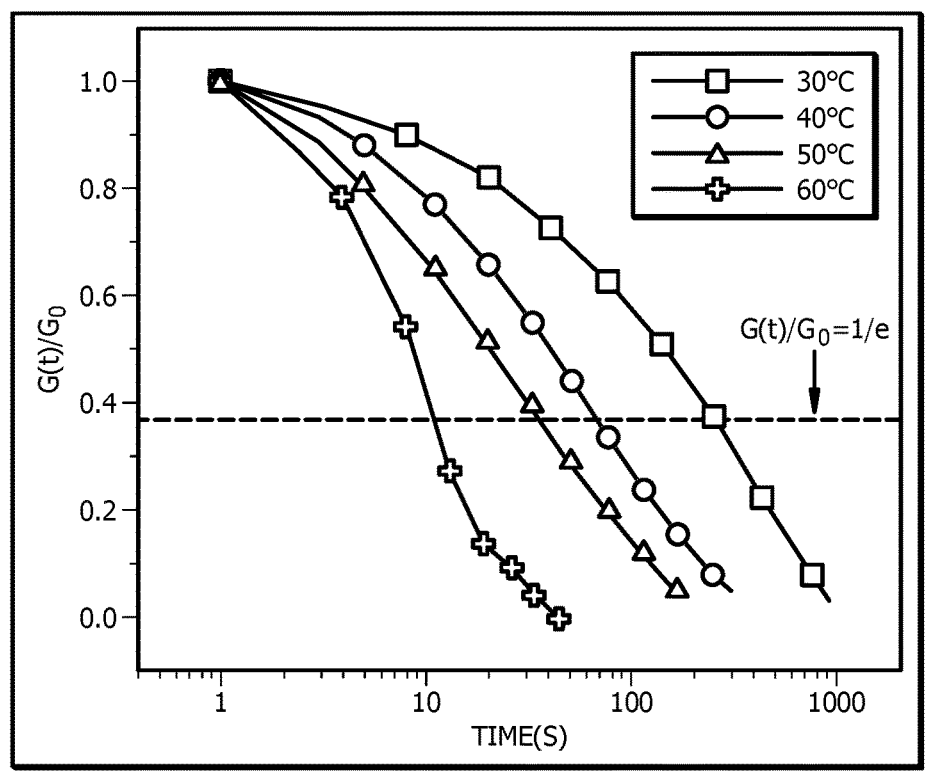
FIG. 9 demonstrates stress relaxation of EN-VAN-AP at elevated temperature.

In various examples, Once formed, the thermoset(s) according to embodiments described herein can be recycled in a number of ways, including being reformed using heat, being welded and repaired, and/or being depolymerized and reformed. Starting with being reformed, an elevated temperature can be used to reform the resulting thermoset in some embodiments. Through imine bond exchange reaction, the thermoset can exhibit stress relaxation at elevated temperature. For example, the thermoset can be heated and any applied stress can be relaxed. Similarly, the stress relaxation can allow for reshaping of the thermoset using an increased temperature. For example, the material can be heated and reshaped without breaking as a result of the imine bond exchange reactions at elevated temperatures. In an embodiment, a thermoset with proper stiffness and glass transition temperature can be converted to malleable materials at elevated temperature that can be recycled through injection molding. This can allow the material to be recycled and/or reformed through the application of heat alone. As an example, a stress relaxation experiment on EN-VAN-AP was carried out. FIG. 9 illustrates the time dependence of the normalized relaxation modulus ($G(t)/G_0$) at different temperatures in the range from 30 to 60° C. The $G(t)/G_0$ values decreased with time and went to zero, indicating full stress relaxation. Even though the thermoset was not soluble in common solvents, the frill stress relaxation at elevated temperature suggested the typical behavior of a viscoelastic liquid. The relaxation time was 251 s at 30° C. and reduced significantly to 11 s when temperature increased to 60° C. By comparison, the widely-studied polyester crosslinked thermosets required much higher temperature (>200° C.) to get such fast stress relaxation. The difference in relaxation time among thermosets could be affected by crosslink density, the exchange reaction kinetics, density of exchangeable groups, and the intrinsic rigidity of monomers. The fast stress relaxation at relatively low temperature in this work could facilitate the thermoset reprocessing like shape transformation and welding.

Figure 10:
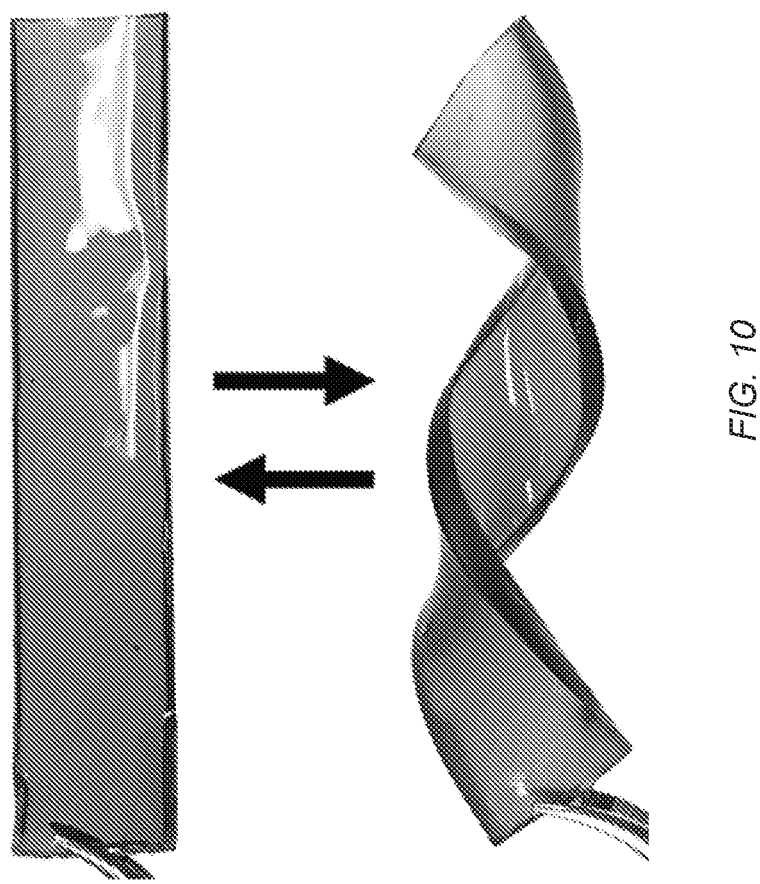
FIG. 10 demonstrates shape of EN-VAN-AP can be reversibly transformed.

In some embodiments, shape transformation of thermoset is achieved which is further evidence supporting the stress relaxation of thermoset at elevated temperature. As an example, an EN-VAN-AP strip with dimensions of 125 mm L×12.5 mm W×2.2 mm T was used for illustration. By heating the strip at 80° C. using a heat gun for 2 minutes, the rigid thermoset strip was converted into a viscoelastic state. At this time, the strip was twisted into a helical fusilli-like shape by rotating one mobile clamp. When the thermoset was cooled to room temperature, the helical fusilli-like shape was retained (FIG. 10). To recover the shape of thermoset back to a flat strip, additional force and heat were needed. The shape transformation of the thermoset was attributed to the imine bond exchange reactions at elevated temperature. Conventional permanently cross-linked epoxy thermosets, however, cannot exhibit stress relaxation at elevated temperature and are prone to fracture when additional force is applied. For example, the rigid permanently cross-linked epoxy thermoset (e.g., EN-BPA), however, was prone to fracture when similar twisting force was applied.

The mechanical properties and the ability to change the shape of the material can be based on the composition and cross-linking within the material. In an embodiment, adjusting the stiffness and cross-linking density of the thermoset through modifying its compositions can change the temperature and force needed for shape transformation of thermoset. The composition of the thermoset can be modified through the choice and selection of a thermoset precursor composition and/or precursor mixture composition. Further, the choice and amount of hardener can also affect the final thermoset composition, and thereby affect the temperature and force needed to reshape the thermoset.

Advantageously, the recyclable thermoset described herein can be welded and repaired. For example, pieces of the material formed from the thermoset can be contacted and processed to bond the pieces together. In some embodiments, pressure and heat can be used to exchange imine bonds within the material to join the two pieces together. The joining process can be referred to as "welding" herein with regard to the two elements formed from the thermoset material. The welding process may allow for easy processability and formation of components in a way that is not possible with traditional formed thermoset materials. In some embodiments, the welding process can use a promoter such as water to facilitate the imine exchange reaction.

As a demonstration of the weldable and repairable nature of the thermosets described herein, multiple pieces of thermoset material can be overlapped and heated at 50-250° C., with 1-100 Newtons (N) force applied over a time period of 1 second to several minutes, followed by heating at 50-250° C. for 5 minutes to 24 hours to fully weld the thermoset samples together. In some cases, water can be applied to the thermoset pieces before overlapping the pieces for welding.

Figure 11B:
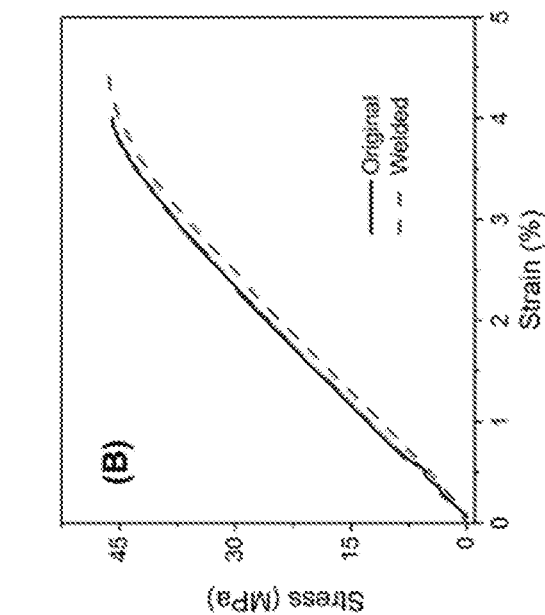
FIG. 11B exhibits tensile strength of welded EN-VAN-AP is comparable to original sample.
Figure 11A:
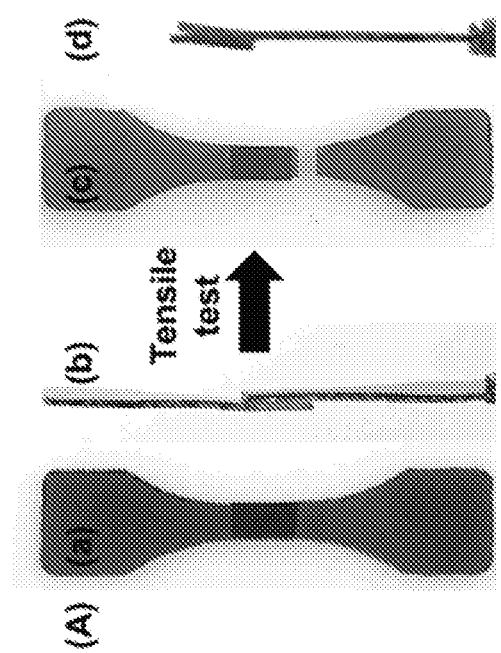
FIG. 11A exhibits the physical arrangement of the portions of the samples overlapped and welded.

By utilizing the imine exchange reaction occurring at the interface of overlapped thermoset pieces, EN-VAN-AP was also weldable and repairable. As an example, a rectangular EN-VAN-AP film (50 mm L×12.5 mm W×0.4 mm T) was cut into two pieces in the middle. The two pieces were overlapped by ca. 3.2 mm on a Teflon sheet and preheated at 100° C. for 60 s. During the preheating period, a ca. 10 N force was manually applied to the overlapping area to facilitate the welding. It was observed that the two pieces started to attach to each other. The film was then transferred to an oven and heated at 120° C. for 4 h for welding, which required no additional pressure or amine monomer. After the welding process, a dog-bone shaped sample was punched out, while the overlapped area was left in the middle of the sample (FIG. FIG. 11A, elements (a) and (b)). The welded sample, which possessed the same dimensions as the original sample (prepared using the same punch), was subjected to tensile test. As seen in FIG. 11A, elements (c) and (d), the welded sample always fractured at a different place rather than the overlapped area, suggesting the overlapped area was not the weakest part of the sample. Meanwhile, tensile strength and elongation at break of welded sample were 46 MPa and 4.4%, respectively, which were comparable to the original sample (FIG. 11B).

The welding process can be used to repair components made from the thermoset materials. In some embodiments, for a fractured or detached thermoset, the repairing method comprises overlapping thermoset pieces at the detached ends by a suitable amount and applying heat on the overlapped area until the detached thermosets are rejoined.

In another embodiment, the repairing method comprises using an additional thermoset piece with a suitable dimension to cover the detached area. Applying heat on the overlapped area until the detached thermosets are rejoined.

In certain embodiments, the welding process, including the use of the weld to repair components, can rely on the addition of a promoter such as water. Water treatment on the thermoset surface can reduce the stiffness of rigid thermoset, and promote the dissociation of imine bonds into amines, which accelerates the imine exchange reactions and therefore the welding process. Water is gradually removed from the thermoset during the welding process as heat is applied. An amount of water and/or the welding time can be selected to allow any water used as a promoter to be removed from the welded component prior to reuse of the component. In some embodiments, the use of a promoter may be sufficient to allow the components to be welded using only the promoter and heat without the addition of any extra force. In yet another embodiment, for thermosets with high stiffness, both water and additional pressure may be needed to promote the imine exchange reactions occurring at the interface of overlapped areas.

The thermoset(s) can also be recycled using one or more solvents to depolymerize the materials followed by recasting and forming the materials. The recyclable thermosets presented herein can be depolymerized in certain solvents when specific chemical stimuli are applied. The thermoset depolymerization process can be initiated by placing thermoset material in a suitable solvent. As described in more detail herein, solvents can include, but are not limited to, benzene, toluene, methanol, ethanol, tetrahydrofuran (THF), dimethylformamide (DMF), dimethyl sulfoxide (DMSO), water, methylene chloride, ethyl acetate, i-propanol, chloroform, dioxane, pyridine, acetone, acetic acid, acetonitrile, ethylene glycol or any combination thereof. The selection of the solvent can affect the desired specific properties of recycled thermoset.

Recycling of thermosets can be initiated by immersing the thermoset in one or more of the previously mentioned solvents in a ratio of thermoset to solvent of 0.01-1:1-100. Acid can be added to the mixture of thermoset and solvent. The acid can be used to promote the dissociation of the imine bonds within the thermoset, thereby promoting the solubility in the solvent. Suitable acids can include, for example, inorganic acids including hydrochloric acid, nitric acid, sulfuric acid, chloric acid, perchloric acid, hydrobromic acid, and/or hydroiodic acid; organic acids including formic acid, acetic acid, propionic acid, oxalic acid, lactic acid, p-toluenesulfonic acid and/or aminomethylphosphonic acid. When an acid is present, the acid can be present at a molar concentration of the acid of between about 0.01-5 M. The acid can be selected to be compatible with and soluble in the solvent. In some embodiments, solid acids including silico-aluminates (zeolites, alumina, silico-alumino-phosphate), sulfated zirconia, metal oxides (titania and zirconia), sulfonated polystyrene, and/or solid phosphoric acid can be used. The mixture of thermoset, solvent, and acid can then be heated to between 0-200° C. for 0.01-72 hours during depolymerization of the thermosets.

In some embodiments, the recyclable thermosets presented herein may be formulated as composites incorporating fillers including but not limited to monomers, polymers fillers, plasticizers, fibers (e.g., carbon fiber, glass fiber, etc.), metals, glass, wood, flame retardants, pigments, dyes, antioxidants, lubricants, or any combination thereof. When recyclable thermosets containing fillers are treated with solvent, acid, and optional heat using methods designed to depolymerize the thermoset, the fillers can be recovered by filtration or other means of separation and selectively isolated from the depolymerized thermoset. Recycled fillers and/or new fillers can be used to reform composite materials when the dissolved and depolymerized thermosets are recycled and reformed.

During the recycling process, the solvent can be used with suitable depolymerization conditions. As an example, EN-VAN-AP could be transformed into smaller and soluble oligomers using proper degradation conditions via acid-aided hydrolysis of the imine linkages. As an example, EN-VAN-AP was cut into pieces (ca. 4 mm L×3 mm W×2 mm T) and immersed in 1.5 mL of solvents (benzene, toluene, ethanol, THF, DMF, DMSO and water) with various hydrochloric acid (HCl) concentrations and temperature for two days (FIG. 8A to 8D). At room temperature or 65° C. with no HCl acid added, EN-VAN-AP exhibited good resistance to solvents after two days. EN-VAN-AP exhibited mainly swelling behavior, with a limited portion dissolved (<15 wt. %, FIG. 8E).

As an example, hydrochloric acid was selected to depolymerize the thermosets. This selection was based on its strong acidity, compatibility with hydrophilic solvent and low boiling point that can be readily removed along with solvent during the drying process. At low hydrochloric acid concentration (0.17 mol/L), a limited portion (<6 wt. %) of thermoset was dissolved in toluene and benzene. This was related to: 1) limited compatibility of HCl solution with toluene and benzene, as reflected by the uneven corrosion on thermoset surface and 2) poor compatibility of decomposed thermoset in these solvents as indicated by the aggregation of depolymerized residue in toluene and benzene (FIG. 8). By comparison, use of THF, ethanol, DMF, DMSO and/or water yielded a homogenous solution of the decomposed residue. Especially, 100% of EN-VAN-AP was dissolved in water at 25° C. with HCl concentration as low as 0.17 mon, which was significantly higher than other solvents. This could be attributed to the specific sensitivity of imine bonds to water. Increasing the temperature to 65° C. and maintaining the same hydrochloric acid concentration (0.17 mol/L) accelerated the dissociation of thermosets, resulting in 100 wt. % dissolution of EN-VAN-AP in DMSO and water, 79 wt. % in DMF, 40 wt. % in ethanol, 14 wt. % in THF and ~7 wt. % in toluene and benzene after 2 days. This phenomenon meant EN-VAN-AP could be readily decomposable when treated by mild conditions. The affinity of thermoset to solvent followed the order: water>DMSO>DMF>ethanol>THF>benzene≈toluene (FIG. 8E), which was consistent with the polarity of these solvents. Under certain conditions, e.g., thermoset to solvent weight ratio of 0.01-1:1-100, acid concentration of 0.01-5 M, temperature of 65-150° C., the thermosets could reach 100 wt. % dissolution in solvents like DMSO, water, DMF, ethanol, THF, methanol, ethyl acetate etc. Compared to the degradation of conventional epoxy thermosets that often involves harsh conditions like high temperature and strong acid/base, the facile degradation and solubility of EN-VAN-AP in slightly acidified hydrophilic solvents, especially water, highlight its environmental importance.

In some embodiments, using a proper solvent and acid, the above process can be used to depolymerize composite materials that contain the thermoset examples described herein. In an embodiment, fillers can be separated from composites when the thermoset part is dissolved in solvents as treated by acid and heat. Using proper separation process, fillers can be collected and reused.

In one or more examples of the technology disclosed herein, thermosets can be depolymerized, recycled, and repolymerized into new thermosets with physical properties similar to the virgin thermoset. Recycling of thermosets can be initiated by immersing the thermoset in one or more of the previously mentioned solvents in a ratio of thermoset to solvent of 0.01-1:1-100. Acid can be added to the mixture of thermoset and solvent. The mixture of thermoset, solvent, and acid can then be heated to induce depolymerization of the solid thermoset and form a depolymerized thermoset liquid or gel which may be soluble in the mixture of solvent and acid.

In some cases, the recyclable thermosets presented herein may be formulated as composites incorporating fillers including but not limited to monomers, polymers fillers, plasticizers, carbon fiber, glass fiber, metals, glass, wood, flame retardants, pigments, dyes, antioxidants, lubricants, or any combination thereof. When recyclable thermosets containing fillers are treated with solvent, acid, and optional heat using methods designed to depolymerize the thermoset, the fillers can be recovered by filtration or other means of separation and selectively isolated from the depolymerized thermoset without damaging the structure of the fillers.

Following optional removal of optional fillers, solvent and acid can be removed from the dissolved thermoset by several processes including, but not limited to, evaporation. In some cases, the mixture of acid, solvent, and depolymerized thermoset can be heated at 25-200° C. for 0.5-72 hours to remove acid and/or solvent. This step can be carried out to produce a mixture having desired properties. In some embodiments, removal of solvent and acid from the depolymerized thermoset can be stopped before complete removal of solvent and/or acid to allow the mixture to remain in a flowable or processable state. The mixture can optionally be transferred to a mold in which the thermoset can optionally be repolymerized. The remaining solvent and acid can be removed from the depolymerized thermoset by heating at 25-200° C. for 0.5-72 hours. As the remaining acid and/or solvent is removed, the depolymerized thermoset can be allowed to re-polymerize. Optionally, fillers including, but not limited to, monomers, polymers fillers, plasticizers, carbon fiber, glass fiber, metals, glass, wood, flame retardants, pigments, dyes, antioxidants, lubricants, or any combination thereof can be added to the depolymerized thermoset prior to complete repolymerization to form a composite. Using these methods fillers, such as carbon fibers used to form carbon fiber reinforced composites (CFRCs) incorporating the recyclable thermosets described herein, can be recycled without damaging the structure of the carbon fiber.

In some embodiments, a filler including any of those described herein including carbon fibers within a composite material formed from a thermoset as described herein can be recycled. The process can include depolymerizing the thermoset using a solvent and an acid. The filler can be removed from the resulting mixture using filtering. The depolymerized thermoset can then be recovered and reused to form a new composite with the same or a different filler. In some embodiments, the filler can be used with a different thermoset to form a new composite material.

To facilitate the depolymerization and recycling process and without wishing to be limited by theory, it is believed that the solvents should have proper properties including: 1) high solubility for thermoset, 2) reasonable boiling point that can be readily removed, and 3) the solvent should allow the properties of recycled thermoset should be comparable to original thermoset. The above observation indicates that solvents such as toluene, benzene, THF and ethanol may not be suitable in some instances due to their low solubility for depolymerized thermoset. As examples, DMF, DMSO and water exhibited sufficient solubility of EN-VAN-AP when treated with hydrochloric acid and can be used for thermoset recycling. From the aspect of solvent removal, DMSO might be problematic due to its high boiling point (189° C.). For example, DMSO may take longer to remove under reduced pressure from the polymer solution than when DMF or water are used as solvents. The use of DMSO can increase separation difficulty, while the presence of DMSO residue in recycled thermoset might lead to reduced cross-link density, decreased water resistance, and possibly compromised mechanical and thermal properties. As for water, the thermoset recovered from water solution exhibited significantly poor water resistance. It deformed quickly when immersed in water at room temperature, even though no acid was added. This could be related to the high affinity of HCl to water, which made HCl difficult to be completely removed from the polymer matrix. The trapped trace amount of HCl could still lead to significant deformation of recycled thermoset when exposed to water. DMF exhibited the highest suitability among studied solvents for thermoset recycling, since it demonstrated sufficient solubility and reasonable boiling point, while the properties of recycled thermoset were retained.

Figure 12A:
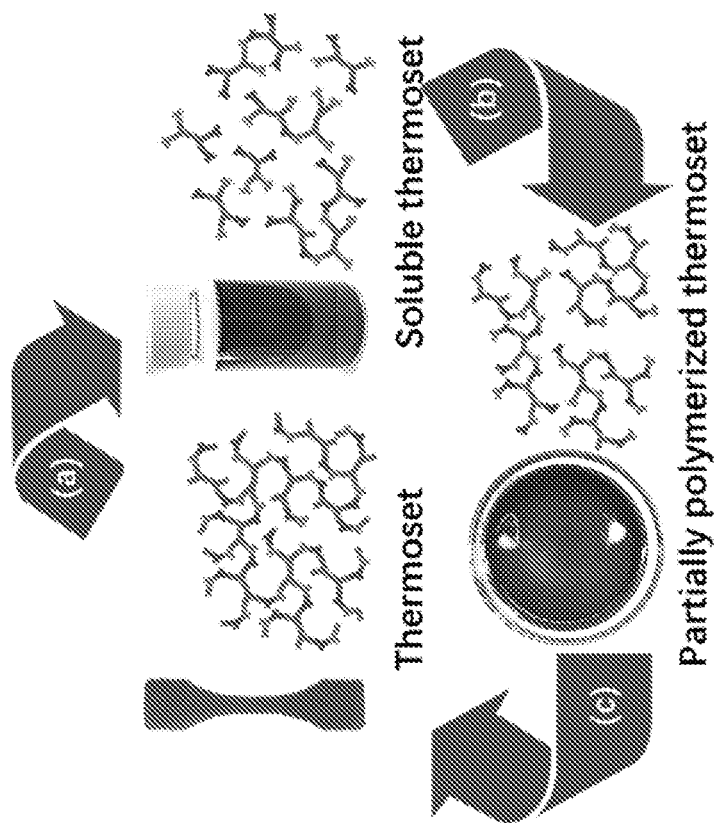
FIG. 12A exhibits recycling process of EN-VAN-AP according to an embodiment.

As an example, using the EN-VAN-AP/DMF weight ratio of 1:10, HCl concentration of 0.25 mol/L and stirring, EN-VAN-AP could be fully dissolved within 1 h at 65° C. (FIG. 12A, element (a)). The DMF solution of depolymerized EN-VAN-AP was transferred to a glass mold. The solution was dried by two steps: 1) the mixture was heated at 80° C. and dried by an air flow to get rid of ca. 60% volume, and 2) the mixture was slowly dried under vacuum at room temperature overnight to remove most of the volatile components, leaving the depolymerized EN-VAN-AP as a viscous polymer gel (FIG. 12A, element (b)).

Figure 13:
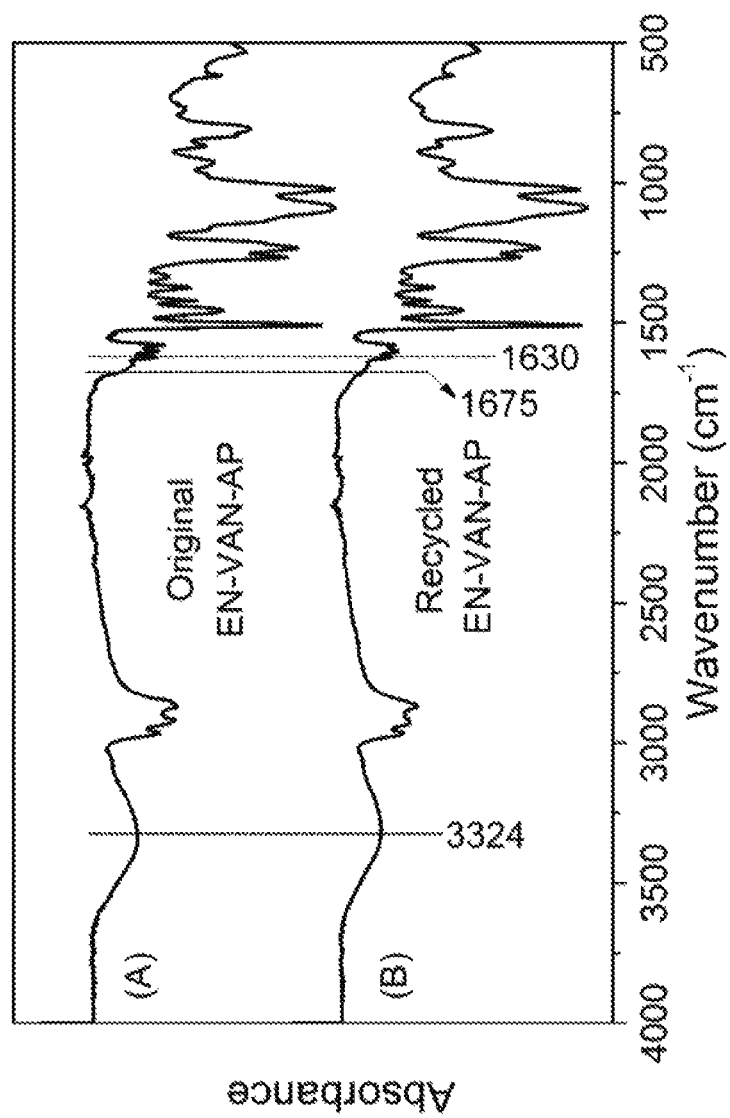
FIG. 13 exhibits structure of recycled EN-VAN-AP is similar to original sample as measured by IR spectra.
Figure 15:
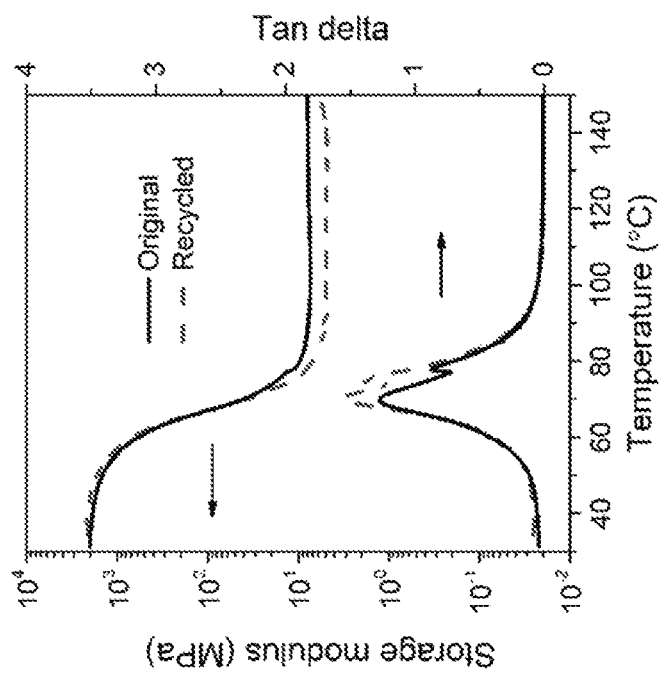
FIG. 15 exhibits storage modulus and $T_g$ of recycled EN-VAN-AP is retained when compared to original sample.
Figure 14:
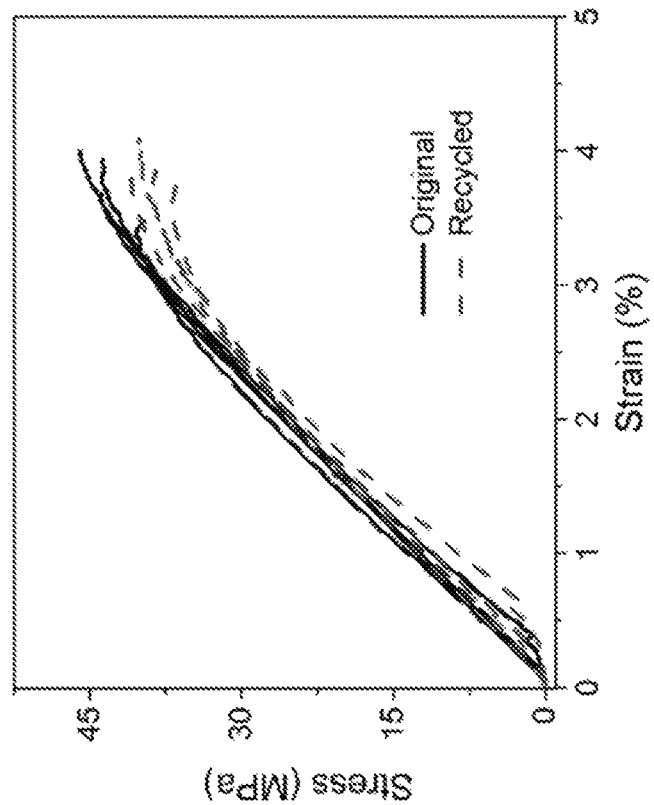
FIG. 14 exhibits tensile strength of recycled EN-VAN-AP is retained when compared to original sample.
Figure 16:
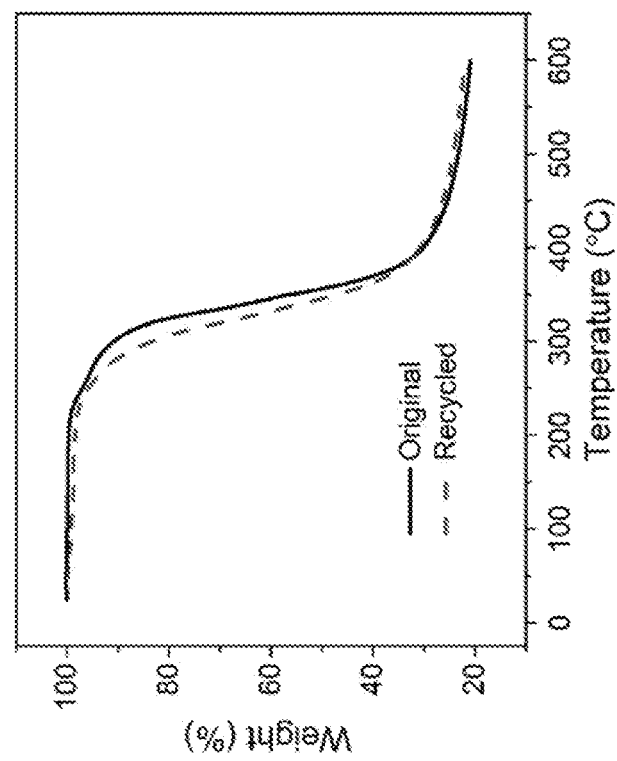
FIG. 16 depicts thermal stability of recycled EN-VAN-AP is retained when compared to original sample.

It should be noted that after acid-aided depolymerization, the DMF solution contained a mixture of polymer chains with terminal aldehyde and/or amine groups. While the original thermoset was formed through epoxy-amine reactions, formation of recycled thermoset was realized via aldehyde-amine reactions. During the drying processes, as HCl was gradually evaporated, the rate of imine bonds formation increased, and the molecular weight of polymer chains continuously increased. At the end of the drying process, a viscous polymer gel was formed. The gel was further heated at 120° C. for 24 h to promote solvent residue evaporation, facilitate the aldehyde-amine reactions and recreate the polymer network (FIG. 12A, element (c)). The infrared (IR) spectrum of recycled thermoset revealed no aldehyde group, suggesting the aldehyde-amine reaction was complete. Moreover, IR spectra of original and recycled thermosets exhibited the same pattern, which indicated recycled thermoset retained similar chemical structure to original thermoset (FIG. 13). Tensile test of recycled thermoset exhibited no major decrease in mechanical stiffness and strength compared to original sample (FIG. 14). Storage modulus, $T_g$ and $T_{onset}$ of recycled sample were also retained (FIGS. 15 and 16), indicating there was limited recycling fatigue during the remolding process.

In some embodiments, other solvents that can be used during the thermoset recycling process include, but are not limited to, methylene chloride, tetrahydrofuran, ethyl acetate, i-propanol, chloroform, dioxane, pyridine, acetone, acetic acid, acetonitrile, ethanol, methanol, ethylene glycol, DMSO, water, and combinations thereof, depending on the desired specific properties of recycled thermoset.

In some embodiments, acidified aqueous solution can be used to decompose the thermoset as described herein. The acidified aqueous solution can be then extracted with certain organic solvents like DMF to extract the decomposed thermoset. The organic solution can then be evaporated and heated to reform the thermoset.

In some embodiments, additional fillers can be introduced during the recycling process to obtain thermoset with different compositions compared to the original thermoset. In some embodiments, the additional fillers include, but are not limited to, monomers, polymers fillers, plasticizers, carbon fiber, glass fiber, metals, glass, wood, flame retardants, pigments, dyes, antioxidants, lubricants, or any combination thereof.

In certain embodiments, using proper solvent and acid, the above process can be used to recycle composites that contain the thermoset made as described herein.

In one or more embodiments, fillers can be separated from composites when the thermoset portion of the composite is dissolved in solvents that are treated with acid and heat. Using a proper separation process, fillers can be collected and reused. Using the above described recycling process, the dissolved thermoset can be recycled. This approach converts composite into new thermoset and reusable fillers.

In another embodiment, fillers can be separated from composites when the thermoset portion of the composite is dissolved in solvents that are treated by acid and heat. Using a proper separation process, fillers can be collected and reused. Using the above described recycling process, the dissolved thermoset can be recycled. During the thermoset recycling process, collected fillers can be put back to the thermoset to make new composite with similar composition to original composite.

In yet another embodiment, fillers can be separated from composites when the thermoset portion of the composite is dissolved in solvents that are treated by acid and heat. Using proper separation process, fillers can be collected and reused. Using the above described recycling process, the dissolved thermoset can be recycled. During the thermoset recycling process, collected fillers or other fillers or additional compounds can be introduced to the thermoset to make a new composite with a different composition to original composite.

The mild conditions used to recycle the invented thermosets allow for substantial (e.g., greater than 90 wt. %, greater than 95 wt. %, near complete, etc.) recycling of the carbon fiber from CFRCs without damaging the fiber structure or decreasing mechanical strength.

Figure 12B:
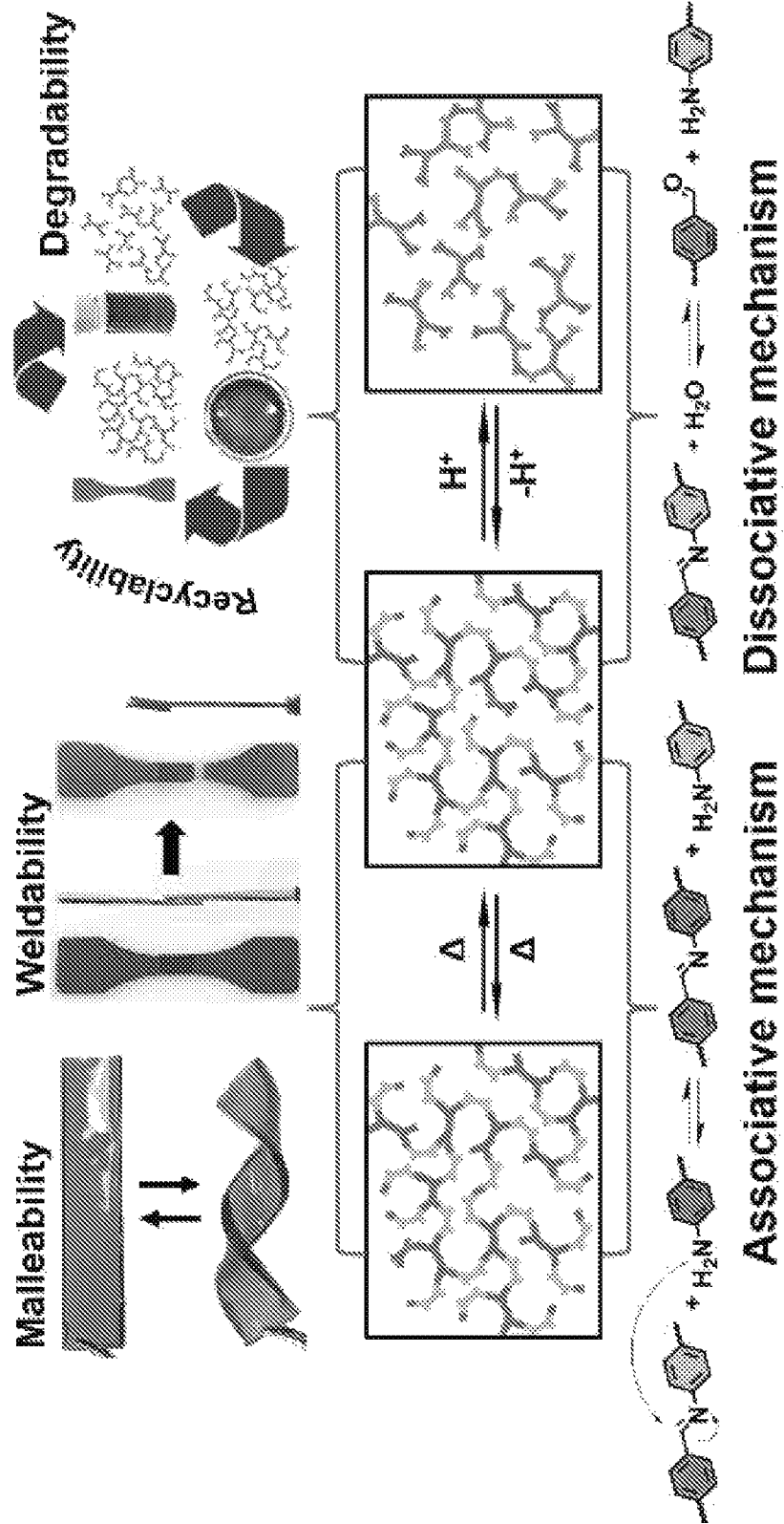
FIG. 12B exhibits mechanisms of association and dissociation for the thermoset compositions according to an embodiment.
Figure 17:
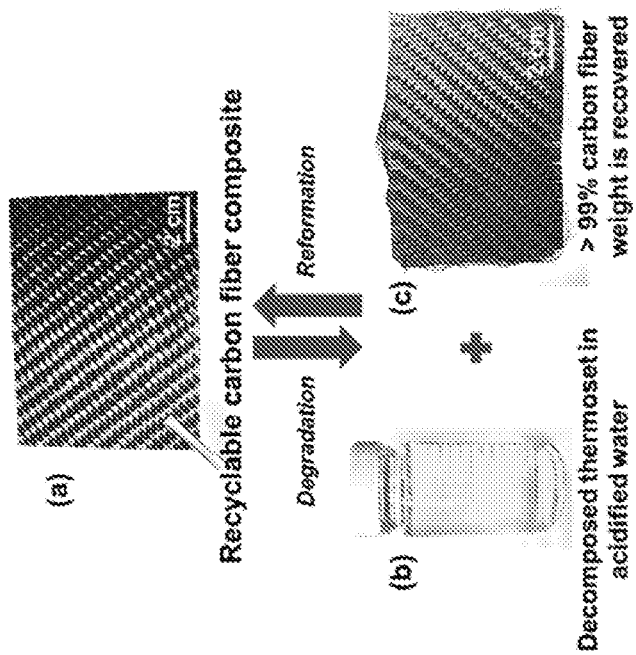
FIG. 17 depicts carbon fiber can be recycled from CFRC.

As an example, a thermoset composite comprised of commercial carbon fiber and a thermoset as described herein as the matrix was prepared for illustration. As seen in FIG. 17, the thermoset matrix can be dissolved into acidified aqueous solution, the leftover carbon fiber remained intact and could be easily reused. Using the thermoset recycling method as shown in FIG. 12, a new carbon fiber composite can be made from both recycled thermoset and carbon fiber. This approach is more advantageous than the recycling of conventional carbon fiber composites by pyrolysis, in which the chopped carbon fibers lose significant strength and value while no thermoset matrix can be recovered.

Advantageously, the weldable properties of the recyclable thermosets described herein makes it possible to assemble and repair carbon fiber reinforced composites (CFRCs) through welding. As a demonstration of the weldable and repairable nature of the CFRCs incorporating recyclable thermosets described herein, multiple pieces of CFRCs can be overlapped and heated at 25-250° C., with 1-200 Newtons (N) force applied over a time period of 1 second to several hours, followed by optional heating at 50-250° C. for 5 minutes to 24 hours to fully weld the thermoset samples together. In some cases, water can be applied to the CFRC pieces before overlapping the pieces for welding.

Figure 18:
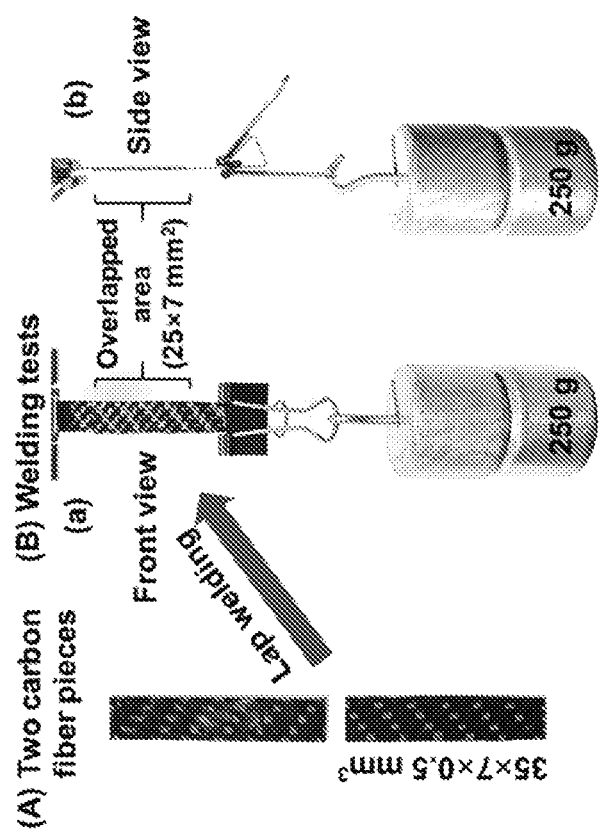
FIG. 18 depicts a welding test of carbon fiber composites using the thermosets according to an embodiment.

An example is shown in FIG. 18. As shown, two carbon fiber pieces (each had the dimension of ~35 mm×7 mm×0.5 mm) were lap-welded with the overlapping area of 25×7 mm². The welding process required ~60 N force at 120° C. for 5 min. The welded sample could support at least 250 g of weight as shown in FIG. 18 (In fact, the welded sample could support significantly heavier weight than 250 g. The two pieces were welded so well that it was difficult to tear them apart manually.) By comparison, conventional BPA-based carbon fiber composites cannot undergo similar welding/assembling process.

Figure 19:
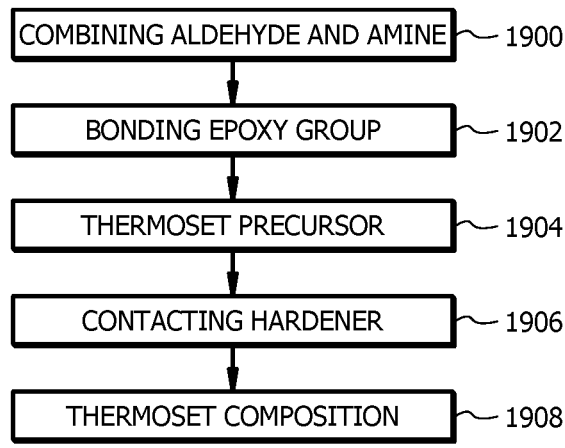
FIG. 19 depicts a flowchart illustrating a method of making a thermoset composition.

The thermosets can be manufactured as described herein. In some embodiments, the thermosets can be manufactured according to a process as shown in FIG. 19. To begin, in step 1900 an aldehyde can be combined with an amine so as to form a backbone comprising an imine bond bonding aromatic compounds together or bonding an aromatic compound to an aliphatic chain. The aldehyde and the amine combined in step 1900 can be derived from a renewable or natural sources.

In step 1902, and epoxy group can be bonded to at least one end of the backbone. A thermoset precursor can then be formed based on the bonding of the epoxy group in step 1904.

The thermoset precursor formed in step 1904 can have a variety of structures. For example, the thermoset precursor composition can comprise a backbone comprising an imine bond bonding aromatic compounds together or bonding an aromatic compound to an aliphatic chain, with either one having an epoxy group terminating the backbone. In some embodiments, each end of the backbone can be terminated with an epoxy group, or the backbone can be terminated at one end with an aldehyde group and at the other end with the epoxy group. In some embodiments, a first aromatic ring can be connected between a second aromatic ring and a third aromatic ring, and the first aromatic ring can be connected to the second aromatic ring with a first imine bond and the first aromatic ring can be connected to the third aromatic ring with a second imine bond.

In some embodiments, the thermoset precursor can have imine bonds made from aldehydes and phenols derived from a renewable or natural source such as biomass. The resulting thermoset precursor can have two epoxy groups, or one epoxy group and one aldehyde group or at least two aldehyde groups. The thermoset precursor can have four or more aromatic rings, three aromatic rings, two aromatic rings, or one aromatic ring and an aliphatic chain. The thermoset precursor can be connected by imine bonds with the at least one epoxy or aldehyde group attached to each aromatic group or aliphatic chain. The epoxy group can include, but is not limited to, a glycidyl or a cycloaliphatic group.

In step 1906, the thermoset precursor can be contacted with at least one hardener at so as to form combination of the precursor and the hardener. This can occur at room temperature, a temperature below an initiation temperature, or at a temperature below a reaction temperature to cross-link the thermoset precursors. Once initiated (e.g., by being heated), the thermoset precursors can be cross-linked, which can include reacting the epoxy group with an amine in a hardener. In some embodiments, step 1906 can include contacting precursor with a hardener including, but not limited to, an amine, an anhydride, a carboxylic acid, an amide, an isocyanate resin, or a phenolic resin. The hardener can be an amine hardener for reaction with epoxy groups. The contacting in step 1906 can occur at room temperature so as to form a combination of the thermoset precursor and the hardener. The combination can then be heated to a temperature of between 40-200° C. followed by cooling the combination (e.g., cooling to room temperature, etc.).

Based on the contacting in step 1906, a thermoset composition can result in step 1908. The thermoset composition can have a number of structures. In some embodiments, a thermoset composition can include a plurality of any of the thermoset precursors with cross-links between the precursors, wherein the cross-links include the epoxy group. The cross-links between the precursors can include the epoxy group combined with an amine or a compound resulting from a reaction between the epoxy group and the amine. In some embodiments, the composition of the aromatic compound or the aliphatic chain is selected so that the thermoset composition can be dissolved in organic and/or aqueous media and remolded with full retention of mechanical and thermal properties.

In some embodiments, the water resistance of the thermoset composition can be tuned by adjusting a hydrophobicity of the thermoset precursor and/or a hydrophobicity of a hardener in the thermoset. Similarly, a content of the imine bonds in the thermoset precursor can be selected to tune a water resistance of the thermoset composition. In some embodiments, a water-resistant coating can be provided on the thermoset composition, or a filler can be used to enhance the water resistance of the thermoset. In some embodiments, a composition of the aromatic groups, the aliphatic chain, and/or a number of the imine bonds is selected so that the thermoset exhibits full recovery of mechanical properties and thermal stability after drying even when deformed upon immersion into water.

In some embodiments, the water resistance of imine-containing thermoset may be impacted by the content of imine bonds and the cross-link density of the thermoset. In some embodiments, the water resistance of imine-containing thermoset may be impacted by the content of imine bond and crosslink density of the thermoset. Previously reported imine-containing thermosets were mainly prepared through direct condensation of polyfunctional aldehydes and amines. In these networks, imine bonds acted as the cross-linking sites. However, because of the water-sensitive nature of imine bonds, strength of thermosets was reported to decrease when exposed to water. As disclosed herein, the imine bonds are embedded within the backbone (e.g., a backbone of diglycidyl ether, etc.) while crosslinking was realized through epoxy-amine reactions. This approach can increase the crosslink density, while decreasing the content of imine bonds within the network (e.g., epoxy reacts with NI 2 in 2:1 ratio, while aldehyde reacts with —$NH_2$ in 1:1 ratio), both of which can improve the water resistance of imine-containing thermosets.

It is expected that the water resistance of the thermosets can decrease as imine content increased. Further, when the imine bonds are "protected" by adjacent phenyl groups and other covalent cross-links, the water resistance can increase although water molecules may still gradually penetrate the network by hydrolyzing the imine bond and eventually soften the thermoset. Similarly, increased cross-link density can help decrease the exposure of imine bond to water molecules. For example, a thermoset composition possessing lower imine content while still highly cross-linked can exhibit improved water resistance over the straightforward aldehyde-amine cross-linked thermosets.

Figure 20:
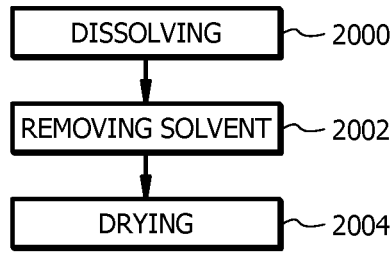
FIG. 20 illustrates a process for recycling/reprocessing an already prepared thermoset.

A process for recycling/reprocessing an already prepared thermoset (e.g., as fabricated according to FIG. 19) is illustrated in FIG. 20. In step 2000 the thermoset can be dissolved in an organic or aqueous solvent by addition of external stimulus including, but not limited to, heat, an acid, and/or a co-reagent. In some embodiments, step 2000 can comprise dissolving the thermoset in a solvent capable of recovering and recycling additional components added to the thermoset. The additional components can include, but not limited to, monomers, polymers, fillers, plasticizers, fibers, metals, glass, wood, flame retardants, pigments, dyes, lubricants, carbon fiber, and antioxidants.

In step 2002, the solvent can be optionally removed using any of the processes described herein. In step 2004, the resulting material can optionally be dried by heating to an elevated temperature or by exposing the resulting material to a vacuum. The use of a vacuum can occur at or near room temperature in some embodiments.

Figure 21:
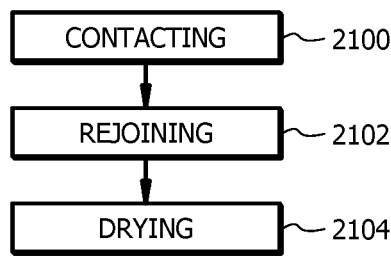
FIG. 21 is a flowchart illustrating a method for repairing a fractured or detached thermoset.

The resulting thermoset composition can be used to be weldable and/or repairable with other thermoset compositions as described herein. In some embodiments, the thermoset composition can be welded by application of heat to a fractured or detached area of the thermoset composition. A flowchart illustrating such a method for repairing a fractured or detached thermoset comprising the thermoset composition (e.g., as fabricated in accordance with FIG. 20) or formed using the thermoset precursor as described herein is shown in FIG. 21. In step 2100 multiple pieces or components can be contacted. The contact can occur by being overlapped, abutted, or contacted with a secondary piece of the thermoset composition. For example, fractured areas of the thermoset can be overlapped. Alternatively, a separate repair piece can be used to overlap to separate pieces of the thermoset composition.

In step 2102, the thermoset pieces can be joined and/or rejoining via application of heat and/or a promoter such as water to the thermoset. In some embodiments, pressure can also be applied to the pieces while heat and/or water are used to reform the imine bonds. Once rejoined, the component can optionally be dried in step 2104. The final piece can then be used in the same way as a component made with virgin material without any significant loss of strength or mechanical properties.

EXAMPLES

The embodiments having been generally described, the following, examples are given as particular embodiments of the disclosure and to demonstrate the practice and advantages thereof. It is understood that the examples are given by way of illustration and are not intended to limit the specification or the claims in any manner.

Example 1. Preparation of Recyclable Epoxy Thermosets a. Synthesis of Bisphenols.

A mixture of vanillin (6.08 g, 40 mmol) and 4-aminophenol (4.36 g, 40 mmol) was stirred in water (125 mL) at room temperature for 4 h. The afforded powder was collected by filtration, washed with water and dried in a desiccator to give VAN-AP as a yellowish powder (9.23 g, 95% isolated yield, m.p.=203-204° C.). $^1$H NMR (acetone-$d_6$, 400 MHz) δ: 8.44 (s, 1H, —CH=N—), 7.59 (d, =1.2 Hz, 1H, Ar—H), 7.32 (dd, J=5.4, 1.2 Hz, 1H, Ar—H), 7.17-7.12 (m, 2H, Ar—H), 6.93 (d, J=1.2 Hz, 1H, Ar—H), 687-6.82 (m, 2H, Ar—H), 3.90 (s, 3H, —$OCH_3$). $^{13}$C NMR (acetone-do, 400 MHz) δ: 152.9 (—CH=N—), 151.6, 145.4, 143.7, 140.1, 125.2, 119.7, 117.9, 111.5, 110.7, 105.4, 51.18 (—$OCH_3$).

b. Synthesis of Glycidyl Ethers.

Glycidyl ether of VAN-AP (GE-VAN-AP) was prepared by reacting VAN-AP (2.43 g, 10 mmol) with epichlorohydrin (25 g, 266 mmol). Tetrabutylammonium bromide (0.26 g, 0.85 mmol) was used as a phase transfer catalyst. The mixture was heated at 85° C. for 3 h and followed by a dropwise addition of 5 g of 20% w/w NaOH solution. The reaction was kept for another 2 h, and the mixture was introduced with ethyl acetate, filtrated to remove formed NaCl, washed with water, dried with $Na_2SO_4$, and concentrated with a rotary evaporator to yield GE-VAN-AP as a yellowish solid (3.49 g, 94% isolated yield, m.p.=110-112° C.), $^1$H NMR (CDCl$_3$, 400 MHz) δ: 8.34 (s, 1H, —CH=N—), 7.57 (d, J=1.2 Hz, 1H, Ar—H), 7.23 (dd, =5.7, 1.4 Hz, 1H, Ar—H), 7.17-7.12 (m, 2H, Ar—H), 6.97-6.87 (m, 3H, Ar—H), 4.29 (dd, J=7.6, 2.2 Hz, 1H, —O—$CH_2$—), 4.21 (dd, J=7.3, 2.1 Hz, 1H, —O—$CH_2$—), 4.07-403 (dd, J=7.3, 2.1 Hz, 1H, —O—$CH_2$—), 3.95-3.90 (dd, J=7.3, 2.1 Hz, 1H, —O—$CH_2$—), 3.91 (s, 3H, —$OCH_3$), 3.34 (m, 2H, —CH— in oxirane), 2.93-2.84 (m, 2H, —$CH_2$— in oxirane), 2.79-2.69 (m, 2H, —$CH_2$— in oxirane). $^{13}$C NMR (CDCl$_3$, 400 MHz) δ: 158.5 (—CH=N—), 157.1, 150.9, 150.1, 145.8, 130.6, 124.1, 122.3, 115.4, 112.9, 109.5, 70.24, 69.30, 56.31 (—$OCH_3$), 50.39, 45.19, 44.99.

c. Formation of Epoxy Thermosets.

Two methods can be employed to prepare the epoxy thermosets. Conventional glycidyl ether of BPA (GE-BPA) was cured using the same methods as GE-VAN-AP for comparison of obtained thermosets.

(i) Method 1 (Solvent Free Method).

GE-VAN-AP (3.0 g) was first melted at 115° C. Then, Jeffamine D-400 (CAS 9046-10-0, MW=430 g/mol), with 2:1.05 molar ratio of epoxy vs. $NH_2$— was dropwise added. The mixture was vigorously stirred at 100° C. for 3 min, degassed under vacuum to remove trapped air, poured into mold and cured at 60° C. for 4 h and 120° C. for 20 h. The obtained brownish epoxy thermoset was denoted as EN-VAN-AP. The thermoset can be fully cross-linked within 6 h if cured at temperature above 120° C.

(ii) Method 2 (with Solvent Method).

GE-VAN-AP (3.0 g) was first dissolved in DMF (10 mL). Then, Jeffamine D-400 with 2:1.05 molar ratio of epoxy vs. $NH_2$— was dropwise added. The mixture was vigorously stirred at 60° C. for 10 min, poured into mold and dried under vacuum at room temperature to achieve a polymer gel. Heating the gel at 60° C. for 4 h and 120° C. for 20 h afforded the EN-VAN-AP as a brownish solid. The thermoset can be fully cross-linked within 6 h if cured at temperature above 120° C.

Infrared spectrum of EN-VAN-AP prepared by both methods exhibited the total disappearance of the signals for epoxy group (912 $cm^{-1}$), while the bond of hydroxyl groups increased, suggesting most epoxy groups have been reacted.

Example 2. EN-VAN-AP can be Decomposed and Soluble in Organic and Aqueous Solutions EN-VAN-AP could be transformed into soluble polymers using proper depolymerization conditions, 1.5 g cured EN-VAN-AP was cut into pieces (ca. 12.5 mm L×5 mm W×2 mm T) and placed in a 20 mL glass vial. At low HCl concentration (0.17 mol/L) at room temperature, DMF, DMSO and water exhibited solubility for EN-VAN-AP. Especially, 100% thermoset was dissolved in water at room temperature. Increasing the temperature to 65° C. and maintaining the same HCl concentration of 0.17 mol/L accelerated the dissociation of thermosets, which resulted in 100 wt. % dissolution of thermoset in DMSO and water, and 79 wt. % in DMF. Using the EN-VAN-AP/DMF weight ratio of 1:10, HCl concentration of 0.25 mol/L and mild stirring, EN-VAN-AP could be fully dissolved within 1 h at 65° C.

Example 3. Process for Recycling the EN-VAN-AP 1.5 g cured EN-VAN-AP was cut into pieces (ca. 12.5 mm L×5 mm W×2 mm T) and placed in a 20 mL glass vial. To this vial was added successively 15 mL of DMF and 12 drops of concentrated HCl. (HCl concentration in DMF solution was about 0.25 mol/L). The mixture was then heated up at 65° C. and mildly stirred. Thermoset pieces were found to dissolve gradually, and a homogenous solution was obtained after 1 h. DMF and HCl in the homogenous solution were slowly evaporated when stirred at 80° C. with the aid of an air flow. When thin polymer film started to form on the surface of solution (at this point, ca. 7 mL solution was left), the solution was transferred to a glass mold. The mixture was then placed in a vacuum desiccator to remove the leftover DMF and HCl. After 16 h, a viscous polymer gel was formed. The gel was put in an oven at 120° C. for 24 h to obtain the recycled EN-VAN-AP.

EN-VAN-AP can also be recycled using the following method 1.5 g cured EN-VAN-AP was cut into pieces (ca, 12.5 mm L×5 mm W×2 mm T) and placed in a 20 mL glass vial. To this vial was added successively 15 mL of water and 12 drops of concentrated HCl (HCl concentration in aqueous solution was about 0.25 mol/L). The mixture was then heated up at 65° C. and mildly stirred. Thermoset pieces were found to dissolve gradually, and a homogenous solution was obtained after 1 h. Then, the solution was extracted three times with 5 mL of DMF used for each extraction. The DMF solution was slowly evaporated when stirred at 80° C. with the aid of an air flow. When thin polymer film started to form on the surface of solution (at this point, ca. 7 mL solution was left), the solution was transferred to a glass mold. The mixture was then placed in a vacuum desiccator to remove the leftover DMF. After 16 h, a viscous polymer gel was formed. The gel was put in an oven at 120° C. for 24 h to obtain the recycled EN-VAN-AP.

The mechanical and thermal properties of original and recycled EN-VAN-AP and EN-BPA are shown in Table 1.

| Thermoset | Stress (MPa) | Strain (%) | $E_{30}'$ (MPa) | $T_\alpha$ (° C.) | E' at $T_\alpha$ + 30° C. (MPa) | $\nu$ ($10^{-3}$ mol/$cm^3$) | $T_{onset}$ (° C.) | $T_{d30}$ (° C.) | $Char_{500}$ (%) |
|---|---|---|---|---|---|---|---|---|---|
| Original | | | | | | | | | |
| EN-VAN-AP | 46 | 4.0 | 2004 | 71 | 7.4 | 2.59 | 271 | 334 | 23 |
| Recycled | | | | | | | | | |
| EN-VAN-AP | 41 | 3.8 | 2113 | 72 | 4.9 | 1.71 | 257 | 320 | 23 |
| EN-BPA | 45 | 3.8 | 1925 | 71 | 10.1 | 3.53 | 350 | 386 | 5 |

Example 4. EN-VAN-AP is Weldable and Repairable

A rectangular EN-VAN-AP film (50 mm L×12.5 mm W×0.4 mm T) was cut into two pieces by a razor. The two pieces were overlapped by ca. 3.2 mm on a Teflon sheet and preheated at 100° C. for 60 s. During the preheating period, a ca. 10 N force was manually applied to the overlapping area to facilitate the welding. It was observed that the two pieces started to attach to each other. The film was then transferred to an oven and heated at 120° C. for 4 h for welding, which required no additional pressure or amine monomer.

After the welding process, a dog-bone shaped sample was punched out, while the overlapped area was left in the middle of the sample. The welded sample, which possessed the same dimensions as the original sample (prepared using the same punch), was subjected to tensile test. The welded sample always fractured at a different place rather than the overlapped area, suggesting the overlapped area was not the weakest part of the sample. Meanwhile, tensile strength and elongation at break of welded sample were 46 MPa and 4.4%, respectively, which were comparable to the original sample.

Example 5. EN-VAN-AP is Malleable

An EN-VAN-AP strip with dimensions of 125 mm L×12.5 mm W×2.2 mm T was used. By heating the strip at 80° C. for 2 min, the rigid thermoset was converted into a viscoelastic state. At this time, the strip was twisted into a helical fusilli-like shape. When the thermoset was cooled to room temperature, the helical fusilli-like shape was retained. Applying another force and heat could recover the thermoset to its original flat shape.

Example 6. CFRCs Using EN-VAN-AP as Matrix can be Recycled

A CFRC sheet (100 mm×80 mm×1 mm) comprised of commercial carbon fiber and EN-VAN-AP as the matrix was prepared via hand lamination. Putting the sheet in 50 mL of acidified aqueous solution (0.25 mol/L HCl) at 65° C. gradually dissolved the EN-VAN-AP matrix within 1 h. The leftover carbon fiber remained intact and could be easily reused after separation from the dissolved EN-VAP-AP matrix. Using the thermoset recycling method as shown in Example 3, a new carbon fiber composite can be made from both recycled thermoset and carbon fiber.

Example 7. CFRCs Using EN-VAN-AP as Matrix can be Assembled Through Welding

Two CFRC pieces comprised of commercial carbon fiber and EN-VAN-AP as matrix (each CFRC piece had the dimension of ~35 mm×7 mm×0.5 mm) were lap-welded with the overlapping area of 25×7 mm². The welding process required ~60 N force at 120° C. for 5 min. The welded sample could support at least 250 g of weight. (In fact, the welded sample could support significantly heavier weight than 250 g. The two pieces of CFRC were welded so well that it was difficult to tear them apart manually.)

GE-VAN Based Thermoset.

Example 8. Preparation of Recyclable Epoxy Thermosets a. Synthesis of Prepolymer.

Glycidyl ether of vanillin (GE-VAN) was prepared by reacting vanillin (15.2 g, 0.1 mol) with epichlorohydrin (38.0 g, 0.41 mol). Tetrabutylammonium bromide (0.76 g, 0.25 mmol) was used as a phase transfer catalyst. The mixture was heated at 85° C. for 2.5 h and followed by a dropwise addition of 25 g of 40% w/w NaOH solution. The reaction was kept for another 2.5 h. The mixture was left overnight at room temperature to precipitate the product, which was then filtrated, washed with water, and dried under vacuum to yield GE-VAN as a light yellowish solid (19.6 g, 94% isolated yield). $^1$H NMR (CDCl$_3$, 400 MHz) δ: 9.83 (s, 1H, —CHO), 7.47-7.33 (m, 2H, Ar—H), 7.00 (d, J=8.4 Hz, 1H, Ar—H), 4.36 (dd, J=11.4, 3.1 Hz, 1H, —O—CH$_2$—), 4.08 (dd, J=11.4, 5.7 Hz, 1H, —O—CH$_2$—), 3.91 (s, 3H, —OCH$_3$), 3.41 (dd, J=14.8, 13.1 Hz, 1H, —CH— in oxirane), 2.92 (dd, J=6.1, 2.8 Hz, 1H, —CH$_2$— in oxirane), 2.80 (dd, J=6.1, 2.8 Hz, 1H, —CH$_2$— in oxirane). $^{13}$C NMR (CDCl$_3$, 400 MHz) δ: 191.18, 153.80, 150.35, 127.04, 112.62, 109.79, 106.23, 70.36, 56.46, 50.33, 45.21.

c. Formation of Epoxy Thermosets.

Two methods can be employed to prepare the epoxy thermosets.

(i) Method 1 (Solvent Free Method).

GE-VAN was first melted at 100° C., Then, Jeffamine (MW=230) was dropwise added to obtain a 1:1.5 molar ratio of GE-VAN vs. —NH$_2$. The mixture was vigorously stirred at 100° C. for 3 min, degassed under vacuum to remove trapped air, quickly transferred into a mold, and heated at 60° C. for 4 h followed by 120° C. for 24 h to form the network (EN-VAN). The thermoset can be fully cross-linked within 6 h if cured at temperature above 120° C.

(ii) Method 2 (with Solvent Method).

GE-VAN was first dissolved in N,N-dimethylformamide. Then, Jeffamine (MW=230) was dropwise added to obtain a 1:1.5 molar ratio of GE-VAN vs. —NH$_2$. The mixture was vigorously stirred at 60° C. for 10 min, poured into mold and dried under vacuum at room temperature to achieve a polymer gel. Heating the gel at 60° C. for 4 h and 120° C. for 20 h afforded the thermoset network EN-VAN. The thermoset can be fully cross-linked within 6 h if cured at temperature above 120° C.

Infrared spectrum of EN-VAN prepared by both methods exhibited the total disappearance of the signals for epoxy group (912 cm$^{-1}$) and aldehyde (1680 cm$^{-1}$), while the bond of hydroxyl groups increased, suggesting most epoxy groups have been reacted.

Example 9. EN-VAN Can Be Decomposed and Soluble in Organic and Aqueous Solutions EN-VAN could be transformed into soluble polymers using proper depolymerization conditions. 1.5 g cured EN-VAN was cut into pieces (ca. 12.5 mm L×5 mm W×2 mm T) and placed in a 20 mL glass vial. At low HCl concentration (0.17 mol/L) at room temperature, DMF, DMSO and water exhibited solubility for EN-VAN. Especially, 100% thermoset was dissolved in water at room temperature. Increasing the temperature to 65° C. and maintaining the same WI concentration accelerated the dissociation of thermosets. Using the EN-VAN/DMF weight ratio of 1:10, HCl concentration of 0.25 mol/L and mild stirring, EN-VAN could be fully dissolved within 1 h at 65° C.

Example 10. Process for Recycling the EN-VAN 1.5 g cured EN-VAN was cut into pieces (ca. 12.5 mm L×5 mm W×2 mm T) and placed in a 20 mL glass vial. To this vial was added successively 15 mL of DMF and 12 drops of concentrated HCl (HCl concentration in DMF solution was about 0.25 mol/L). The mixture was then heated up at 65° C. and mildly stirred. Thermoset pieces were found to dissolve gradually, and a homogenous solution was obtained after 1 h. DMF and HCl in the homogenous solution were slowly evaporated when stirred at 80° C. with the aid of an air flow. When thin polymer film started to form on the surface of solution (at this point, ca. 7 mL solution was left), the solution was transferred to a glass mold. The mixture was then placed in a vacuum desiccator to remove the leftover DMF and HCl. After 16 h, a viscous polymer gel was formed. The gel was put in an oven at 120° C. for 24 h to obtain the recycled EN-VAN.

EN-VAN can also be recycled using the following method: 1.5 g cured EN-VAN-AP was cut into pieces (ca. 12.5 mm L×5 mm W×2 mm T) and placed in a 20 mL glass vial. To this vial was added successively 15 mL of water and 12 drops of concentrated HCl (HCl concentration in aqueous solution was about 0.25 mol/L). The mixture was then heated up at 65° C. and mildly stirred. Thermoset pieces were found to dissolve gradually, and a homogenous solution was obtained after 1 h. Then, the solution was extracted 3 times with 5 mL DMF used for each extraction. The DMF solution was slowly evaporated when stirred at 80° C., with the aid of an air flow. When thin polymer film started to form on the surface of solution (at this point, ca. 7 mL solution was left), the solution was transferred to a glass mold. The mixture was then placed in a vacuum desiccator to remove the leftover DMF. After 16 h, a viscous polymer gel was formed. The gel was put in an oven at 120° C. for 24 h to obtain the recycled EN-VAN.

Example 11. EN-VAN is Weldable and Repairable

A rectangular EN-VAN film (50 mm L×12.5 mm W×0.4 mm T) was cut into two pieces by a razor. The two pieces were overlapped by ca. 3.2 mm on a Teflon sheet and preheated at 100° C. for 60 s. During the preheating period, a ca. 10 N force was manually applied to the overlapping area to facilitate the welding. It was observed that the two pieces started to attach to each other. The film was then transferred to an oven and heated at 120° C. for 4 h for welding, which required no additional pressure or amine monomer.

After the welding process, a dog-bone shaped sample was punched out, while the overlapped area was left in the middle of the sample. The welded sample, which possessed the same dimensions as the original sample (prepared using the same punch), was subjected to tensile test. The welded sample always fractured at a different place rather than the overlapped area, suggesting the overlapped area was not the weakest part of the sample. Meanwhile, tensile strength and elongation at break of welded sample were 37 MPa and 4.0%, respectively, which were comparable to the original sample.

Example 12. EN-VAN is Malleable

An EN-VAN strip with dimensions of 125 mm L×12.5 mm W×2.2 mm T was used. By heating the strip at 80° C. for 2 min, the rigid thermoset was converted into a viscoelastic state. At this time, the strip was twisted into a helical fusilli-like shape. When the thermoset was cooled to room temperature, the helical fusilli-like shape was retained. Applying another force and heat could recover the thermoset to its original flat shape.

Example 13. CFRCs Using EN-VAN as Matrix can be Recycled

A CFRC sheet (100 mm×80 mm×1 mm) comprised of commercial carbon fiber and EN-VAN as the matrix was prepared via hand lamination. Putting the sheet in 50 mL of acidified aqueous solution (0.25 mol/L HCl) at 65° C. gradually dissolved the matrix within 1 h. The leftover carbon fiber remained intact and could be easily reused. Using the thermoset recycling method as shown in Example 3, a new carbon fiber composite can be made from both recycled thermoset and carbon fiber.

Example 14. CFRCs Using EN-VAN as Matrix can be Assembled Through Welding

Two CFRC pieces using commercial carbon fiber and EN-VAN as the matrix (each had the dimension of ~35 mm×7 mm×0.5 mm) were lap-welded with the overlapping area of 25×7 mm². The welding process required ~60 N force at 120° C. for 5 min. The welded sample could support at least 250 g of weight. In fact, the welded sample could support significantly heavier weight than 250 g. The two pieces were welded so well that it was difficult to tear them apart manually.

Example 15. Water Sensitivity

Figure 22A:
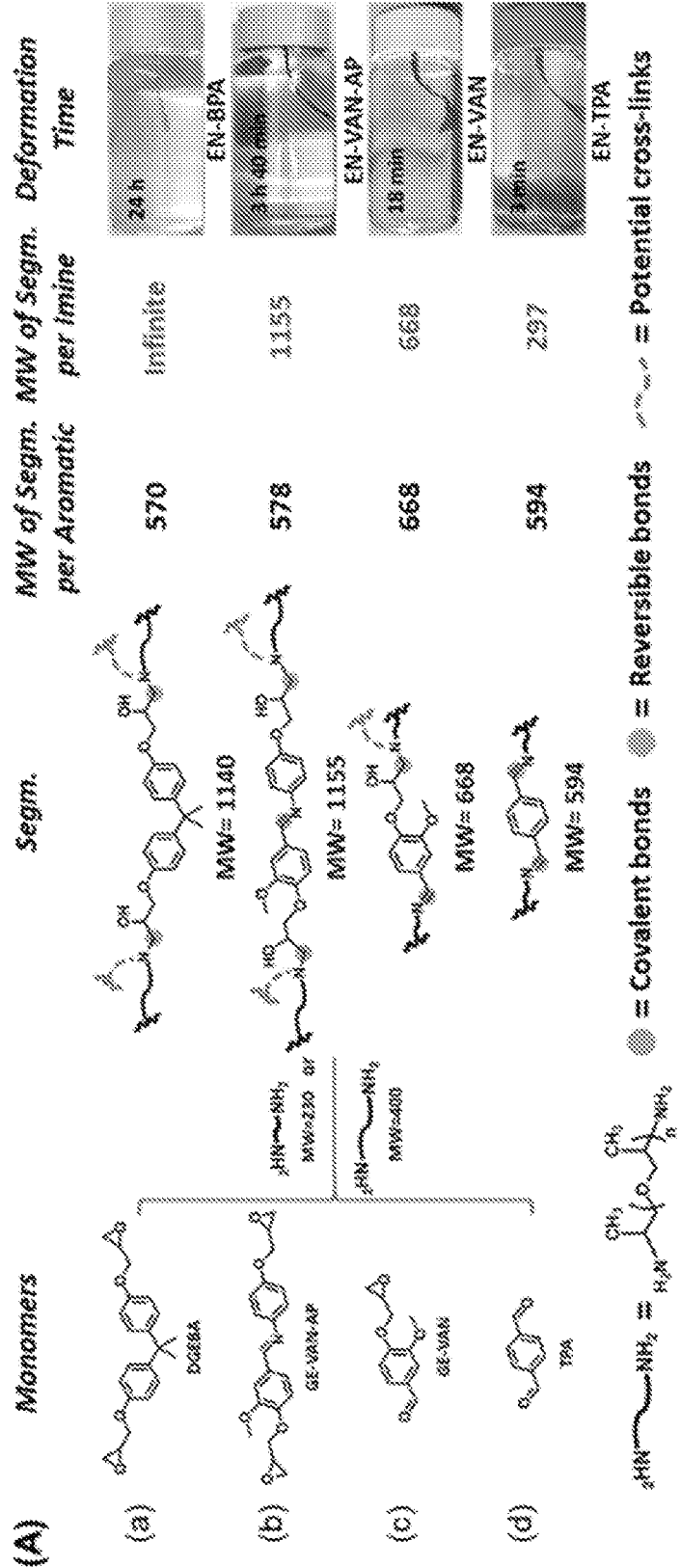
FIG. 22A illustrates the impacts of imine content and crosslink density on water resistance of imine-containing thermosets.
Figure 23:
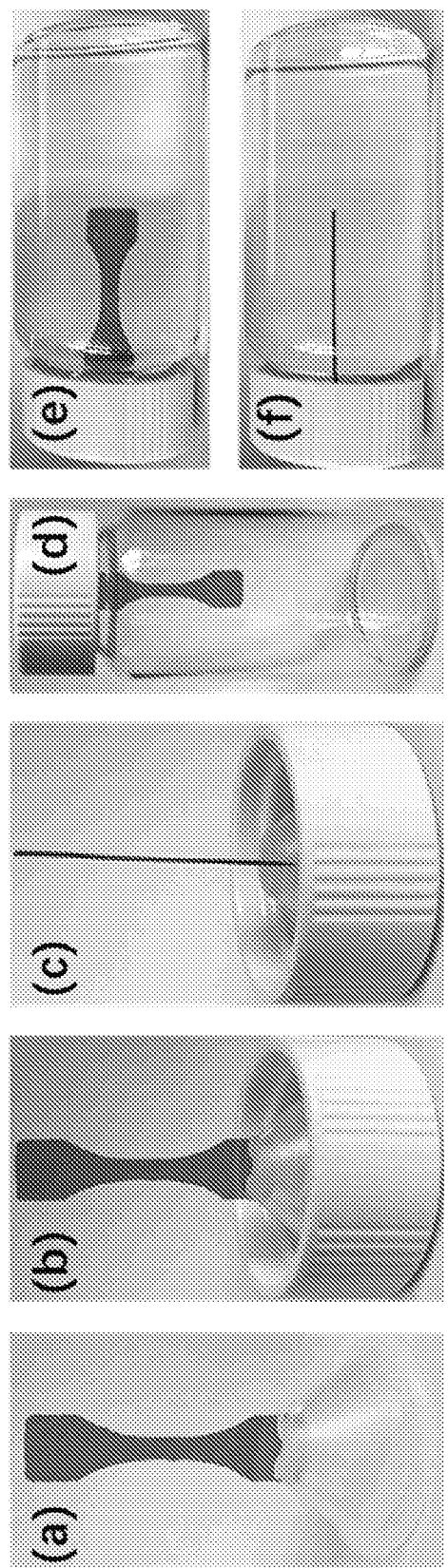
FIG. 23 illustrates Experimental setup for testing water resistance of thermosets as described in Example 15.

As an example of the impacts of the content of imine bonds and cross-link density on the water resistance of thermoset, three precursors, DGEBA, glycidyl ether of vanillin (GE-VAN) and terephthaldehyde (TPA), with various epoxy and aldehyde groups were compared to GE-VAN-AP (FIG. 22A). All precursors were reacted with polyfunctional amine to obtain thermosets containing various contents of imine bonds. Since aromatic motif could increase the strength of thermoset, weight ratio of aromatic ring in each thermoset was kept similar by adjusting the molecular weight of polyamines (MW=230 or 400). All thermosets were cured at 120° C. for 1 to 3 days for complete conversions of epoxy and/or aldehyde groups as confirmed by IR spectra. FIG. 23 demonstrated the experimental setup for testing the water sensitivity of thermosets. As shown in inset (a), the light plastic part in the cap of a 20 mL vial was removed and cut by a razor at the tip. The thermoset sample was inserted and fixed through the notch. In inset (b), the light plastic part with thermoset on it was put back in the cap. Inset (c) is a side view of the arrangement in inset (b). In inset (d), the cap could be screwed up, while thermoset sample was still attached. In inset (e), the vial was filled with water. In inset (f), the water-filled vial was turned to a position where the attached thermoset lied horizontally. The position of the vial was fixed and time for thermoset to obtain certain deformation was recorded. All samples were cut into same shape with same thickness (ca. 0.4 mm). Samples were dried at 120° C. for 24 h before subjecting to water resistance test.

Even though the buoyancy of water could retard the thermoset deformation, the illustrated setup could still provide insight in the relative water resistance of these thermosets. It took only 3 and 18 min for EN-TPA and EN-VAN to lose most of their strength when immersed in water at room temperature. By comparison, EN-VAN-AP exhibited significantly improved water resistance, as it took more than 220 min to get the same deformation. As for EN-BPA, it exhibited the highest water resistance, as only slight deformation was observed even after 24 h.

Rigidity and toughness of EN-VAN-AP can be adjusted by water. Because of the complexity of cross-linked network, a representative polymer segment from each of the four thermosets was illustrated in FIG. 22A for comparison. The segments were simplified to contain one molecule of precursor and two molecules of amine hardener chains that reacted at each side of the precursor. Covalent (formed through epoxy-amine reaction) and reversible bonds (formed by aldehyde-amine reaction) within the segments were highlighted. The aromatic content in each segment was comparable (1 aromatic ring per segmental molecular weight of 570-668. For bisphenol precursors, i.e., DGEBA and GE-VAN-AP, polyamine with MW=400 was used, while for monophenol precursors, i.e., GE-VAN and TPA, polyamine with MW=230 was used). However, the content of reversible imine bonds varied significantly among segments. Water resistance of thermosets decreased as imine content increased. EN-BPA had no reversible bond, and its permanently crosslinked network made it the most resistant to water. EN-VAN-AP has one imine bond per segmental MW of ca. 1115. Although imine bonds were "protected" by adjacent phenyl groups and other covalent crosslinks, water molecules could still gradually penetrate the network by hydrolyzing the imine bond and eventually softened the thermoset. When it came to EN-VAN and EN-TPA, the imine content was doubled and quadrupled (one imine bond per segmental MW of 668 and 297) compared to EN-VAN-AP, respectively. These increments resulted in the deformation of thermosets in much shorter time of exposure. While reduced imine content postponed the deformation of network, increased crosslink density, in a similar way, helped decrease the exposure of imine bond to water molecules. It should be noted that, epoxy reacts with —$NH_2$ in 2:1 molar ratio, while aldehyde reacts with —$NH_2$ in 1:1 molar ratio. Thus, as illustrated in FIG. 4-A, precursors of EN-BPA and EN-VAN-AP could develop in four directions (potential crosslinks were shown in dash lines), while EN-TPA was basically linear. Possessing lower imine content while still highly cross-linked, EN-VAN-AP exhibited improved water resistance over the straightforward aldehyde-amine cross-linked thermosets.

As mentioned herein, deformation of EN-VAN-AP was mainly attributed to the hydrolysis of imine bonds, which was confirmed by the presence of aldehyde group (1675 $cm^{-1}$) in the IR spectrum of wet sample after immersion in water for 24 h. FIG. 22B exhibited the curvy appearance of the wet sample. After drying the wet sample at 120° C. for 24 h, the trapped water was evaporated, imine bonds were reformed, and the sample was restored to its original flat shape. Tensile stress (42 MPa) and strain (4.1%) of fully dried sample (after heating at 120° C. for 24 h) were comparable to the original sample (FIG. 22C, inset (b)), indicating the water-induced deformation could be recovered. By comparison, the wet sample exhibited elastic properties, i.e., breaking stress of 4 MPa and strain of 58% (FIG. 22C, inset (i)), which might be attributed to: 1) reduced cross-links within the network as caused by the hydrolysis of imine bonds and 2) increased void volume taken by water molecules. Tensile properties of thermosets after drying the wet sample at 120° C. for 5 min to 12 h were also exhibited in FIG. 22C, inset (c) to (h). As their stresses were much lower than the original sample, water residue could still exist within these networks and thus they were partially dried. The max stress rapidly, increased from 4 MPa to 28 MPa within 1 h of drying, and slowly advanced to 31 MPa and 37 MPa after 4 h and 12 h of drying. This indicated the water evaporation was very fast at the beginning of drying, and then it became more difficult to get the residual water out of the network as drying proceeded. Unlike the fully dried sample, the partially dried samples were more ductile with strains ranged between 7.4% and 42.7%.

Since the rigidity and toughness of the thermoset could be tuned by water, the example then demonstrated. EN-VAN-AP exhibited water-driven malleability. A 0.4 mm thickness of thermoset film was immersed in water for 4 h at room temperature (FIG. 22D, inset (a)). The wet sample was stretched over a round bottomed flask and placed in a vacuum desiccator to dry the sample under reduced pressure until fully dried (FIG. 22D, inset (b)). The shape of the dried sample was retained (FIG. 22D, inset (c)), and it exhibited robust mechanical properties that could support at least 240 g of loads without significant deformation (FIG. 22D, inset (d) and €). This observation is in agreement with previous studies on imine-containing thermosets, while the water-driven malleability widens the approaches of thermoset reprocessing. For the examples as described herein (and the properties described with respect to the thermoset compositions described herein), the structure of new compounds was examined using nuclear magnetic resonance (NMR) and Fourier-transform infrared (FTIR) spectroscopy. Liquid-state NMR spectra of samples were collected on a Bruker Avance ARX-400 spectrometer using deuterated acetone or chloroform as solvent. Solid-state NMR spectra of samples were collected on a Bruker Ascend 400 MHz (9.4 T) dynamic nuclear polarization (DNP) NMR spectrometer. FTIR analyses were conducted using a Thermo-Nicolet Nexus 470 FTIR Spectrometer equipped with an ultra-high-performance, versatile Attenuated Total Reflectance (ATR) sampling accessory. The spectra were scanned over a wavenumber range of 400-4000 $cm^{-1}$ with a resolution of 4 $cm^{-1}$.

Gel permeation chromatography (GPC) was performed at room temperature using dimethylformamide with 0.01% LiBr as the mobile phase on a Waters 2695 separation module with a Waters 2414 refractive index (RI) detector and Waters 2998 Photodiode Array Detector (PDA). Number average molecular weights (Mn) and weight average molecular weights (Mw) were calculated relative to polystyrene standards.

Dynamic mechanical properties were characterized using a DMA 2980 (TA Instruments). Rectangular specimens with dimensions of 8 mm length, 3.5 mm width and 0.4 mm thickness were measured in a tension mode. The measurements were conducted from 30 to 85° C. at a heating rate of 3° C./min and a frequency of 1 Hz. The temperature at the maximum in the tan δ curve was taken as $T_\alpha$ (related to $T_g$). Cross-link density (v) was calculated from the equilibrium storage modulus in the rubber region over $T_\alpha$ according to the rubber elasticity theory using Equation 1.[53,54]

$$v=E'/(\Phi RT) \quad (1)$$

where E' is the storage modulus at $T_\alpha$30° C. ϕ is the front factor (approximated to 1 in the Flory theory),[55, 56] while R and T are the gas constant and absolute temperature at $T_\alpha$+30° C., respectively.

Stress relaxation experiments were also conducted on a DMA. The measurements were conducted at different temperatures in the range from 30 to 60° C. Thermoset was first heated to the test temperature. After the temperature was equilibrated for 5 min, a 1% strain was applied, and the stress was recorded over time. A constant normal force of 5 N was applied to maintain a good contact of the sample with the parallel plate. The relaxation modulus G(t) were normalized by the "plateau" value $G_0$, which corresponded to the elastic response of the material to the applied strain. This treatment provided an easier comparison between the different temperatures.

Tensile testing was performed on dog-bone shaped specimens according to the ASTM D638 standard, on a custom-built setup on a vertical TwinRail positioning table (Lintech, CA) with a 100 N load cell. Crosshead speed was set to 0.5 mm/min.

Thermal stability studies were carried out on a Discovery Thermo-Gravimetric Analyzer (TGA, TA instruments) under a nitrogen flow of 40 mL/min. Samples (5-10 mg) were placed in a platinum pan and scanned from 40 to 600° C. at a ramp rate of 20° C./min.

These methods can be used with the ranges described herein to provide the test methods for determining the properties of the various thermoset precursors, the resulting thermosets, and the recycled thermosets.

Having described various compositions and methods, certain embodiments can include, but are not limited to:

In a first embodiment, a thermoset precursor composition comprises a backbone comprising an imine bond bonding aromatic compounds together or bonding an aromatic compound to an aliphatic chain; and an epoxy group terminating the backbone.

A second embodiment can include the precursor of the first embodiment, wherein each end of the backbone is terminated with an epoxy group.

A third embodiment can include the precursor of the first or second embodiment, wherein the backbone is terminated at one end with an aldehyde group and at the other end with the epoxy group.

A fourth embodiment can include the precursor of any one of the first to third embodiments, wherein a first aromatic ring connected between a second aromatic ring and a third aromatic ring, wherein the first aromatic ring is connected to the second aromatic ring with a first imine bond and the first aromatic ring is connected to the third aromatic ring with a second imine bond.

A fifth embodiment can include the precursor of the first embodiment, wherein the precursor has one of the following structures:

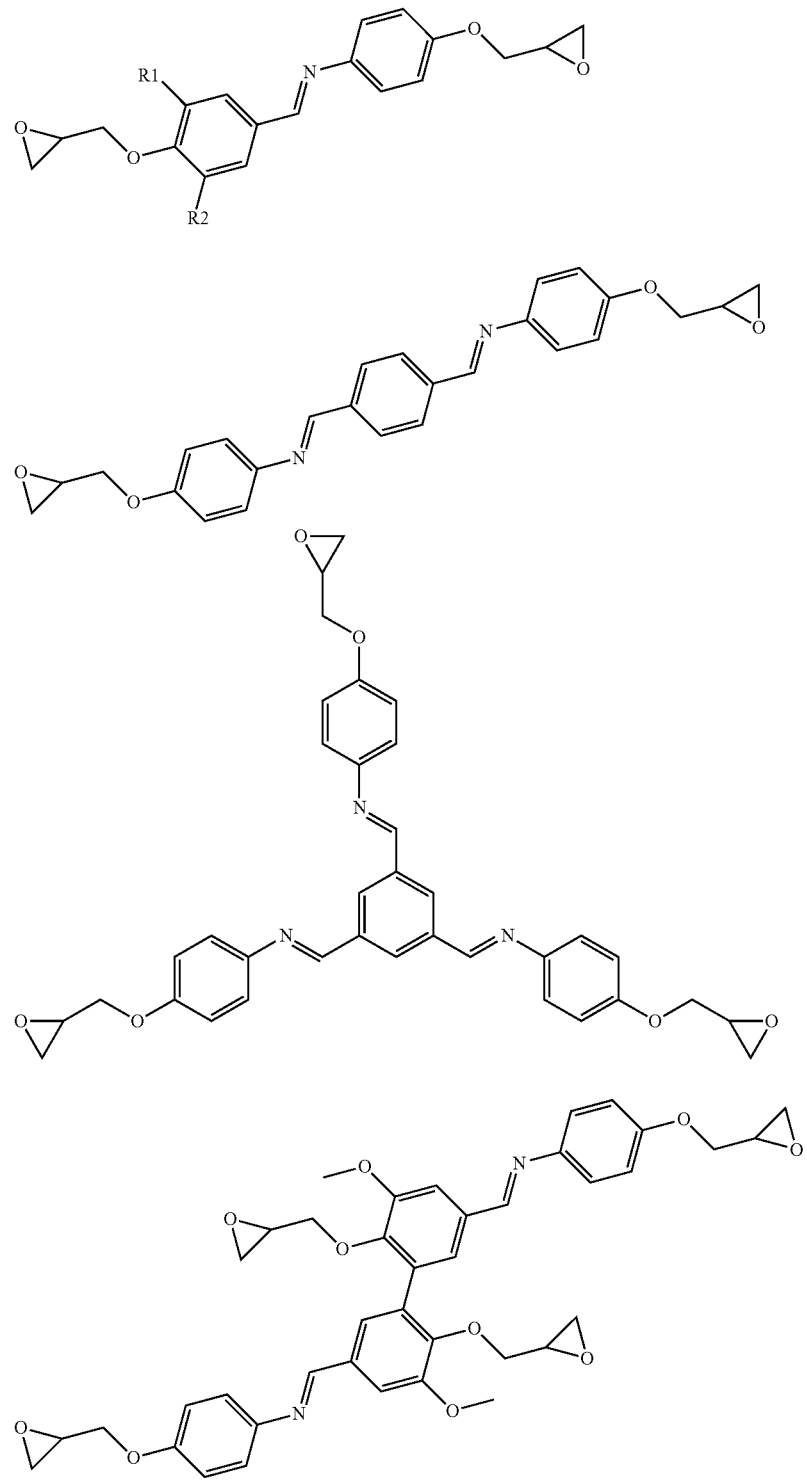

-continued

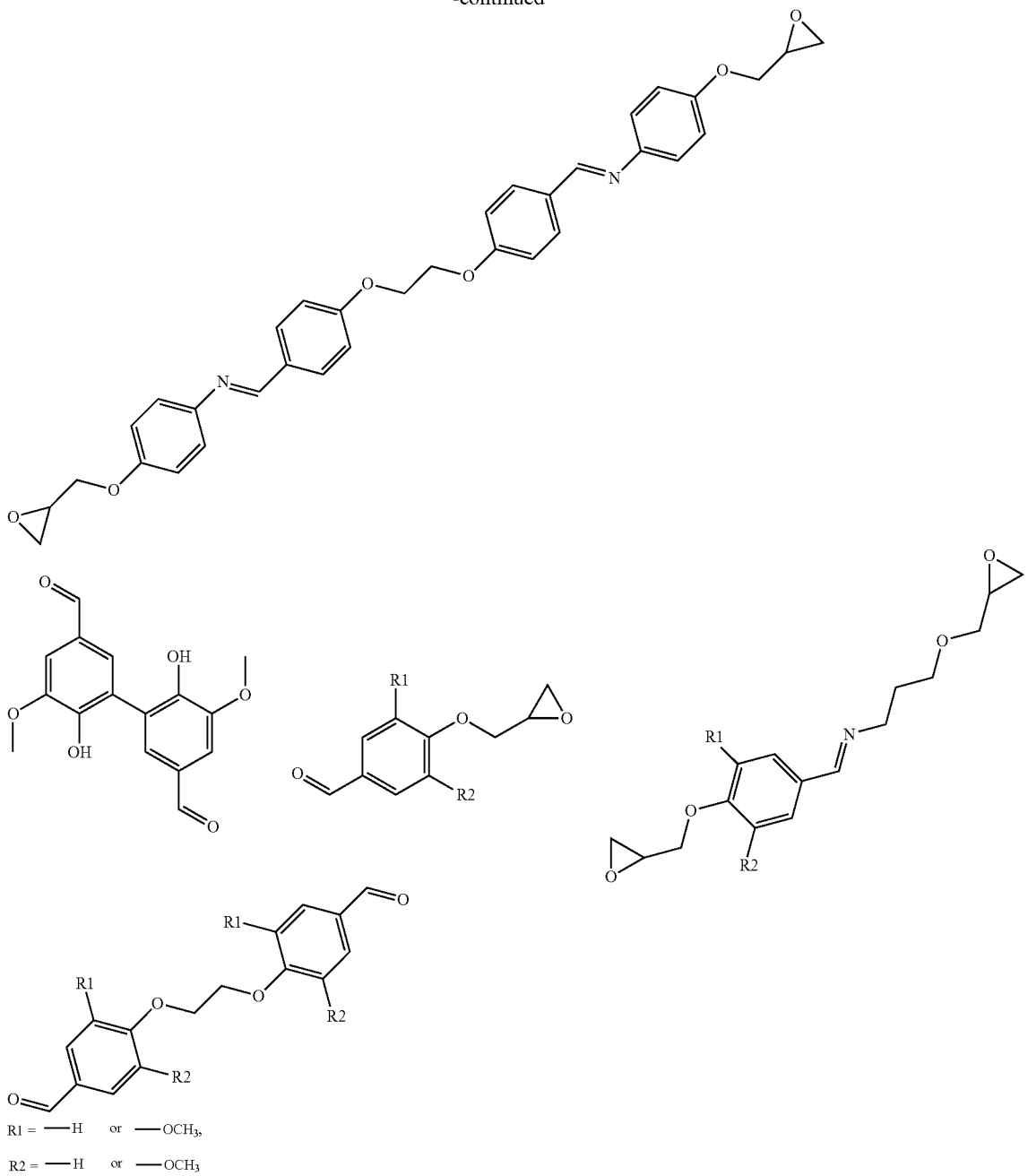

R1 = —H or —OCH₃,
R2 = —H or —OCH₃

A sixth embodiment can include the precursor of any one of the first to fifth embodiments fabricated by combining an aldehyde and an amine derived from a renewable or natural source.

A seventh embodiment can include a thermoset composition comprising a plurality of the precursors of any one of the first to sixth embodiments, further comprising cross-links between the precursors wherein the cross-links include the epoxy group.

In an eighth embodiment, a thermoset composition comprises a plurality of any of the precursors of any one of the first to sixth embodiments, further comprising cross-links between the precursors including the epoxy group combined with an amine or a compound resulting from a reaction between the epoxy group and the amine.

In a ninth embodiment, a method of making a thermoset composition comprises: combining an aldehyde and an amine so as to form a backbone comprising an imine bond bonding aromatic compounds together or bonding an aromatic compound to an aliphatic chain; and bonding an epoxy group to at least one end of the backbone.

A tenth embodiment can include the method of the ninth embodiment, further comprising cross linking a plurality of the precursors, wherein the cross linking comprises reacting the epoxy group with an amine in a hardener.

In an eleventh embodiment, the thermoset precursors or composition of any one of the first to eighth embodiments can be fabricated using the method of the ninth or tenth embodiments.

A twelfth embodiment can include the thermoset precursors or composition of any one of the first to eighth embodiments fabricated using the method of the ninth or tenth embodiment where a composite material is made by incorporation of fillers including but not limited to monomers, polymers, fillers, plasticizers, fibers, metals, glass, glass fiber, wood, flame retardants, pigments, dyes, lubricants, carbon fiber, and antioxidants.

In a twelfth embodiment, a thermoset precursor comprises imine bonds made from aldehydes and phenols derived from a renewable or natural source such as biomass.

A thirteenth embodiments can include the precursor of the twelfth embodiment comprising two epoxy groups or one epoxy group and one aldehyde group.

A fourteenth embodiment can include the precursor of the thirteenth embodiment including three aromatic rings, two aromatic rings, or one aromatic ring and an aliphatic chain.

A fifteenth embodiment can include the precursor of the thirteenth or fourteenth embodiment connected by imine bonds with the at least one epoxy or aldehyde group attached to each aromatic group or aliphatic chain.

A sixteenth embodiment can include the precursor of any one of the first to sixth embodiments, wherein the epoxy group comprises, but is not limited to, a glycidyl or a cycloaliphatic group.

In a seventeenth embodiment, a process for making thermosetting material comprises contacting a thermoset precursor with a hardener including, but not limited to, an amine, an anhydride, a carboxylic acid, an amide, an isocyanate resin, or a phenolic resin.

An eighteenth embodiment can include the process of the seventeenth embodiment, wherein the hardener is an amine hardener preferred for reaction with epoxy groups.

A nineteenth embodiment can include the process of the seventeenth or eighteenth embodiment, wherein the precursor comprises the thermoset precursor of any of the claims 1-16.

In a twentieth embodiment, a method for making a thermoset comprises: contacting at least one precursor with at least one hardener at room temperature so as to form combination of the precursor and the hardener; heating the combination to a temperature of 40-200° C.; and cooling the combination to room temperature.

A twenty first embodiment can include the method of the twentieth embodiment, wherein the precursor comprises the precursor of any one of the first to sixth embodiments.

A twenty second embodiment can include a thermoset composition comprising the thermoset composition of the seventh or eighth embodiment or formed using the precursor of any one of the first to sixteenth embodiments, wherein a composition of the aromatic compound or the aliphatic chain is selected so that the thermoset composition can be dissolved in organic and/or aqueous media and remolded with full retention of mechanical and thermal properties.

In a twenty third embodiment, a process for recycling/reprocessing an already prepared thermoset, comprises: dissolving the thermoset in an organic or aqueous solvent by addition of external stimulus including, but not limited to heat, acid, or co-reagent.

A twenty fourth embodiment can include the process of the twenty third embodiment, further comprising re-creating the thermoset including: removing the solvent; and drying the resulting material by heating to an elevated temperature or by exposing the resulting material to a vacuum at room temperature, re-creating a thermoset with properties similar to the original thermoset.

A twenty fifth embodiment can include the process of any one of the twenty third to twenty fifth embodiments, further comprising dissolving the thermoset in a solvent capable of recovering and recycling additional components added to the thermoset, the additional components including, but not limited to, monomers, polymers, fillers, plasticizers, fibers, metals, glass, wood, flame retardants, pigments, dyes, lubricants, carbon fiber, and antioxidants.

A twenty sixth embodiment can include the process of the twenty fifth embodiment, where additional components are separated and recycled from dissolved thermoset without damaging the physical or chemical properties of the additional components, the additional components including but not limited to monomers, polymers, fillers, plasticizers, fibers, metals, glass, glass fiber, wood, flame retardants, pigments, dyes, lubricants, carbon fiber, and antioxidants.

A twenty seventh embodiment can include the process of any one of the twenty third to twenty sixth embodiments, wherein the thermoset comprises the thermoset composition of the seventh or eighth embodiment or is formed using the thermoset precursor of any one of the first to sixteenth embodiments.

A twenty eighth embodiment can include a thermoset composition comprising the thermoset composition of the seventh or eighth embodiment or formed using the thermoset precursor of any one of the first to sixteenth embodiments, wherein the thermoset composition can be welded by application of heat to a fractured or detached area of the thermoset composition.

A twenty ninth embodiment can include a method for repairing a fractured or detached thermoset comprising the thermoset composition of the seventh or eighth embodiment or formed using the thermoset precursor of any one of the first to sixteenth embodiments, comprising: overlapping fractured areas of the thermoset; and rejoining the fractured areas via application of heat to the thermoset.

A thirtieth embodiment can include a thermoset composition comprising the thermoset composition of the seventh or eighth embodiment or formed using the thermoset precursor of any one of the first to sixteenth embodiments, wherein water resistance of the thermoset composition is tuned by adjusting a hydrophobicity of the thermoset precursor and/or a hydrophobicity of a hardener in the thermoset.

A thirty first embodiment can include the thermoset composition of the thirtieth embodiment, further comprising a content of the imine bonds in the thermoset precursor selected to tune water resistance of the thermoset.

A thirty second embodiment can include the thermoset of the thirtieth or thirty first embodiment, further comprising a water-resistant coating or filler enhancing water resistance of the thermoset.

A thirty third embodiment can include a thermoset composition (e.g., resin) comprising the thermoset composition of the seventh, eighth, thirtieth or thirty first embodiment or formed using the precursor of any one of the first to sixteenth embodiments wherein a composition of the aromatic groups, the aliphatic chain, and/or a number of the imine bonds is selected so that the thermoset exhibits full recovery of mechanical properties and thermal stability after drying even when deformed upon immersion into water.

While several embodiments have been provided in the present disclosure, it should be understood that the disclosed systems and methods may be embodied in many other specific forms without departing from the spirit or scope of the present disclosure. The embodiments and present examples are to be considered as illustrative and not restrictive, and the intention is not to be limited to the details given herein. Many variations and modifications of the systems and methods disclosed herein are possible and are within the scope of the disclosure. For example, the various elements or components may be combined or integrated in another system or certain features may be omitted or not implemented. Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

Numerous other modifications, equivalents, and alternatives, will become apparent to those skilled in the art once the above disclosure is fully appreciated. It is intended that the following claims be interpreted to embrace all such modifications, equivalents, and alternatives where applicable. Accordingly, the scope of protection is not limited by the description set out above but is only limited by the claims which follow, that scope including all equivalents of the subject matter of the claims. Each and every claim is incorporated into the specification as an embodiment of the present systems and methods. Thus, the claims are a further description and are an addition to the detailed description of the present invention. The disclosures of all patents, patent applications, and publications cited herein are hereby incorporated by reference.

What is claimed is:

1. A method of recycling a thermoset composition, the method comprising:
   providing a plurality of thermoset precursors, wherein each thermoset precursor of the plurality of thermoset precursors comprises:
      a backbone comprising an imine bond bonding at least one of: 1) aromatic compounds together, or 2) an aromatic compound to an aliphatic chain; and
      at least one epoxy group terminating the backbone of at least a portion of the plurality of thermoset precursors;
   contacting the plurality of thermoset precursors with a hardener; and
   forming a plurality of cross-links between the plurality of thermoset precursors in response to contacting the plurality of thermoset precursors with the hardener to form a thermoset composition;
   forming a first component from the thermoset composition;
   dissolving the first component formed from the thermoset composition in a solvent to form a mixture;
   removing at least a portion of the solvent from the mixture;
   reforming the thermoset composition into a second component; and
   removing any remaining solvent from the second component to reform the thermoset composition as the second component.

2. The method of claim 1, wherein at least one of the plurality of cross-links comprises an imine bond.

3. The method of claim 1, further comprising one or more fillers disposed in the thermoset composition, wherein the one or more filler comprise: a monomer, a polymer, a plasticizer, a carbon fiber, a glass fiber, a metal, a glass, wood, a flame retardant, a pigment, a dye, a lubricant, an antioxidant, or a combination thereof.

4. A method of claim 1, wherein the thermoset composition is configured to have a water resistance based on a hydrophobicity of the thermoset precursor, a hydrophobicity of a hardener in the thermoset, or both.

5. The method of claim 1, wherein the thermoset composition is configured to have a water resistance based on a concentration of the cross-link bonds between the first backbone and the second backbone.

6. The method of claim 1, further comprising:
   disposing a water-resistant coating on the thermoset composition in the second component.

7. The method of claim 1, wherein a composition of the aromatic compounds, the aliphatic chain, or a number of the plurality of cross-links is selected so that the thermoset exhibits full recovery of mechanical properties and thermal stability after removing the remaining solvent from the second component even when deformed upon immersion into water.

8. The method of claim 1, wherein forming the plurality of cross-links comprises reacting the epoxy group with an amine in the hardener.

9. The method of claim 1, wherein the hardener comprises an amine, an anhydride, a carboxylic acid, an amide, an isocyanate resin, a phenolic resin, or a combination thereof.

10. The method of claim 1, further comprising:
    heating the hardener and the plurality of thermoset precursors to form the thermoset composition, wherein forming the plurality of cross-links occurs in response to the heating; and
    cooling the thermoset composition after forming the plurality of cross-links.

11. The method of claim 10, wherein the heating comprises heating to a temperature of 40-200° C.

12. The method of claim 1, wherein the solvent comprises an organic or aqueous solvent.

13. The method of claim 12, wherein the solvent further comprises an acid or a co-reagent.

14. The method of claim 1, further comprising:
    applying heat during the dissolving.

15. The method of claim 1, wherein the removing of any remaining solvent comprises:
    drying the resulting material by at least one of: heating to an elevated temperature, or exposing the resulting material to a vacuum at room temperature.

16. The method of claim 1, wherein the first component comprises one or more fillers, wherein the method further comprises:
    removing at least a portion of the fillers after dissolving the first component in the solvent.

17. The method of claim 16, wherein the fillers comprise monomers, polymers, plasticizers, fibers, metals, glass, wood, flame retardants, pigments, dyes, lubricants, carbon fiber, antioxidants, or any combination thereof.

18. The method of claim 16, wherein the fillers are removed without damaging the physical or chemical properties of the fillers.

* * * * *